US011471888B2

(12) United States Patent
Jebrail et al.

(10) Patent No.: US 11,471,888 B2
(45) Date of Patent: Oct. 18, 2022

(54) EVAPORATION MANAGEMENT IN DIGITAL MICROFLUIDIC DEVICES

(71) Applicant: mirOculus Inc., San Francisco, CA (US)

(72) Inventors: Mais J. Jebrail, Toronto (CA); Ronald Francis Renzi, Tracy, CA (US); Steven Branda, Livermore, CA (US)

(73) Assignee: mirOculus Inc., San Francisco, CA (US)

(*) Notice: Subject to any disclaimer, the term of this patent is extended or adjusted under 35 U.S.C. 154(b) by 105 days.

(21) Appl. No.: 16/915,835

(22) Filed: Jun. 29, 2020

(65) Prior Publication Data

US 2020/0324290 A1 Oct. 15, 2020

Related U.S. Application Data

(63) Continuation of application No. 15/579,239, filed as application No. PCT/US2016/036022 on Jun. 6, 2016, now Pat. No. 10,695,762.

(Continued)

(51) Int. Cl.

| | |
|---|---|
| ***G01N 27/453*** | (2006.01) |
| ***B01L 3/00*** | (2006.01) |
| ***B01L 7/00*** | (2006.01) |

(52) U.S. Cl.

CPC ... *B01L 3/502784* (2013.01); *B01L 3/502715* (2013.01); *B01L 3/502792* (2013.01);

(Continued)

(58) Field of Classification Search

None

See application file for complete search history.

(56) References Cited

U.S. PATENT DOCUMENTS

| | | |
|---|---|---|
| 4,489,863 A | 9/1984 | Ts'o et al. |
| 4,569,575 A | 2/1986 | Le Pesant et al. |

(Continued)

FOREIGN PATENT DOCUMENTS

| | | |
|---|---|---|
| CA | 2470847 A1 | 7/2003 |
| CA | 2740113 A1 | 4/2010 |

(Continued)

OTHER PUBLICATIONS

Jebrail et al., "A solvent replenishment solution for managing evaporation of biochemical reactions in air-matrix digital microfluidics devices," Lab Chip, 2015, 15, 151-158 (Year: 2014).*

(Continued)

*Primary Examiner* — Alexander S Noguerola

(74) *Attorney, Agent, or Firm* — Shay Glenn LLP

(57) ABSTRACT

Described herein are digital microfluidic (DMF) devices and corresponding methods for managing reagent solution evaporation during a reaction. Reactions on the DMF devices described here are performed in an air or gas matrix. The DMF devices include a means for performing reactions at different temperatures. To address the issue of evaporation of the reaction droplet especially when the reaction is performed at higher temperatures, a means for introducing a replenishing droplet has been incorporated into the DMF device. A replenishing droplet is introduced every time when it has been determined that the reaction droplet has fallen below a threshold volume. Detection and monitoring of the reaction droplet may be through visual, optical, fluorescence, colorimetric, and/or electrical means.

24 Claims, 10 Drawing Sheets

Related U.S. Application Data

(60) Provisional application No. 62/171,772, filed on Jun. 5, 2015.

(52) U.S. Cl.
CPC ......... *B01L 7/525* (2013.01); *B01L 2200/142* (2013.01); *B01L 2200/143* (2013.01); *B01L 2200/16* (2013.01); *B01L 2300/0867* (2013.01); *B01L 2300/1805* (2013.01); *B01L 2300/1822* (2013.01); *B01L 2400/0427* (2013.01)

(56) References Cited

U.S. PATENT DOCUMENTS

| | | | |
|---|---|---|---|
| 4,636,785 | A | 1/1987 | Le Pesant |
| 4,818,052 | A | 4/1989 | Le Pesant et al. |
| 5,034,506 | A | 7/1991 | Summerton et al. |
| 5,130,238 | A | 7/1992 | Malek et al. |
| 5,216,141 | A | 6/1993 | Benner |
| 5,235,033 | A | 8/1993 | Summerton et al. |
| 5,270,185 | A | 12/1993 | Margolskee |
| 5,386,023 | A | 1/1995 | Sanghvi |
| 5,399,491 | A | 3/1995 | Kacian et al. |
| 5,409,818 | A | 4/1995 | Davey et al. |
| 5,411,876 | A | 5/1995 | Bloch et al. |
| 5,455,166 | A | 10/1995 | Walker |
| 5,486,337 | A | 1/1996 | Ohkawa |
| 5,602,240 | A | 2/1997 | De Mesmaeker et al. |
| 5,637,684 | A | 6/1997 | Cook et al. |
| 5,644,048 | A | 7/1997 | Yau |
| 5,681,702 | A | 10/1997 | Collins et al. |
| 5,705,365 | A | 1/1998 | Ryder et al. |
| 5,710,029 | A | 1/1998 | Ryder et al. |
| 5,888,779 | A | 3/1999 | Kacian et al. |
| 6,007,690 | A | 12/1999 | Nelson et al. |
| 6,074,725 | A | 6/2000 | Kennedy |
| 6,294,063 | B1 | 9/2001 | Becker et al. |
| 6,352,838 | B1 | 3/2002 | Krulevitch et al. |
| 6,401,552 | B1 | 6/2002 | Elkins |
| 6,495,369 | B1 | 12/2002 | Kercso et al. |
| 6,565,727 | B1 | 5/2003 | Shenderov |
| 6,596,988 | B2 | 7/2003 | Corso et al. |
| 6,723,985 | B2 | 4/2004 | Schultz et al. |
| 6,773,566 | B2 | 8/2004 | Shenderov |
| 6,787,111 | B2 | 9/2004 | Roach et al. |
| 6,887,384 | B1 | 5/2005 | Frechet et al. |
| 6,911,132 | B2 | 6/2005 | Pamula et al. |
| 6,989,234 | B2 | 1/2006 | Kolar et al. |
| 7,057,031 | B2 | 6/2006 | Olejnik et al. |
| 7,147,763 | B2 | 12/2006 | Elrod et al. |
| 7,163,612 | B2 | 1/2007 | Sterling et al. |
| 7,214,302 | B1 | 5/2007 | Reihs et al. |
| 7,323,345 | B1 | 1/2008 | Stjemstrom |
| 7,328,979 | B2 | 2/2008 | Decre et al. |
| 7,329,545 | B2 | 2/2008 | Pamula et al. |
| 7,349,014 | B2 | 3/2008 | Higashihara |
| 7,390,463 | B2 | 6/2008 | He et al. |
| 7,391,020 | B2 | 6/2008 | Bousse et al. |
| 7,439,014 | B2 | 10/2008 | Pamula et al. |
| 7,445,926 | B2 | 11/2008 | Mathies et al. |
| 7,531,120 | B2 | 5/2009 | Van Rijn et al. |
| D599,832 | S | 9/2009 | Chapin et al. |
| 7,713,456 | B2 | 5/2010 | Dodd et al. |
| 7,727,723 | B2 | 6/2010 | Pollack et al. |
| 7,745,207 | B2 | 6/2010 | Jovanovich et al. |
| 7,763,471 | B2 | 7/2010 | Pamula et al. |
| 7,815,871 | B2 | 10/2010 | Pamula et al. |
| 7,816,121 | B2 | 10/2010 | Pollack et al. |
| 7,822,510 | B2 | 10/2010 | Paik et al. |
| 7,851,184 | B2 | 12/2010 | Pollack et al. |
| 7,897,737 | B2 | 3/2011 | Wu et al. |
| 7,901,947 | B2 | 3/2011 | Pollack et al. |
| 7,919,330 | B2 | 4/2011 | de Guzman et al. |
| 7,939,021 | B2 | 5/2011 | Smith et al. |
| 7,998,436 | B2 | 8/2011 | Pollack et al. |
| 8,007,739 | B2 | 8/2011 | Pollack et al. |
| 8,041,463 | B2 | 10/2011 | Pollack et al. |
| 8,053,239 | B2 | 11/2011 | Wheeler et al. |
| 8,088,578 | B2 | 1/2012 | Hua et al. |
| 8,093,062 | B2 | 1/2012 | Winger |
| 8,137,917 | B2 | 3/2012 | Pollack et al. |
| 8,187,864 | B2 | 5/2012 | Wheeler et al. |
| 8,190,371 | B2 | 5/2012 | Allawi et al. |
| 8,202,686 | B2 | 6/2012 | Pamula et al. |
| 8,202,736 | B2 | 6/2012 | Mousa et al. |
| 8,208,146 | B2 | 6/2012 | Srinivasan et al. |
| 8,268,246 | B2 | 9/2012 | Srinivasan et al. |
| 8,304,253 | B2 | 11/2012 | Yi et al. |
| 8,317,990 | B2 | 11/2012 | Pamula et al. |
| 8,349,276 | B2 | 1/2013 | Pamula et al. |
| 8,364,315 | B2 | 1/2013 | Sturmer et al. |
| 8,367,370 | B2 | 2/2013 | Wheeler et al. |
| 8,389,297 | B2 | 3/2013 | Pamula et al. |
| 8,394,641 | B2 | 3/2013 | Winger |
| 8,399,222 | B2 | 3/2013 | Siva et al. |
| 8,426,213 | B2 | 4/2013 | Eckhardt et al. |
| 8,440,392 | B2 | 5/2013 | Pamula et al. |
| 8,454,905 | B2 | 6/2013 | Pope et al. |
| 8,460,528 | B2 | 6/2013 | Pollack et al. |
| 8,470,153 | B2 | 6/2013 | Feiglin et al. |
| 8,470,606 | B2 | 6/2013 | Srinivasan et al. |
| 8,481,125 | B2 | 7/2013 | Yi et al. |
| 8,492,168 | B2 | 7/2013 | Srinivasan et al. |
| 8,562,807 | B2 | 10/2013 | Srinivasan et al. |
| 8,591,830 | B2 | 11/2013 | Sudarsan et al. |
| 8,592,217 | B2 | 11/2013 | Eckhardt |
| 8,613,889 | B2 | 12/2013 | Pollack et al. |
| 8,637,317 | B2 | 1/2014 | Pamula et al. |
| 8,637,324 | B2 | 1/2014 | Pollack et al. |
| 8,653,832 | B2 | 2/2014 | Hadwen et al. |
| 8,658,111 | B2 | 2/2014 | Srinivasan et al. |
| 8,685,344 | B2 | 4/2014 | Sudarsan et al. |
| 8,685,754 | B2 | 4/2014 | Pollack et al. |
| 8,702,938 | B2 | 4/2014 | Srinivasan et al. |
| 8,716,015 | B2 | 5/2014 | Pollack et al. |
| 8,809,068 | B2 | 8/2014 | Sista et al. |
| 8,821,705 | B2 | 9/2014 | Bjornson et al. |
| 8,845,872 | B2 | 9/2014 | Pollack et al. |
| 8,846,414 | B2 | 9/2014 | Sista et al. |
| 8,852,952 | B2 | 10/2014 | Pollack et al. |
| 8,872,527 | B2 | 10/2014 | Sturmer et al. |
| 8,877,512 | B2 | 11/2014 | Srinivasan et al. |
| 8,888,969 | B2 | 11/2014 | Soleymani et al. |
| 8,901,043 | B2 | 12/2014 | Eckhardt et al. |
| 8,926,065 | B2 | 1/2015 | Winger |
| 8,927,296 | B2 | 1/2015 | Sista et al. |
| 8,936,708 | B2 | 1/2015 | Feigliti et al. |
| 8,951,732 | B2 | 2/2015 | Pollack et al. |
| 8,980,198 | B2 | 3/2015 | Srinivasan et al. |
| 9,005,544 | B2 | 4/2015 | Van Dam et al. |
| 9,011,662 | B2 | 4/2015 | Wang et al. |
| 9,039,973 | B2 | 5/2015 | Watson et al. |
| 9,046,514 | B2 | 6/2015 | Sista et al. |
| 9,091,649 | B2 | 7/2015 | Pollack et al. |
| 9,140,635 | B2 | 9/2015 | Graham et al. |
| 9,188,615 | B2 | 11/2015 | Sturmer et al. |
| 9,223,317 | B2 | 12/2015 | Winger |
| 9,238,222 | B2 | 1/2016 | Delattre et al. |
| 9,248,450 | B2 | 2/2016 | Bauer |
| 9,377,439 | B2 | 6/2016 | Lee et al. |
| 9,435,765 | B2 | 9/2016 | Reimitz et al. |
| 9,446,404 | B2 | 9/2016 | Bauer et al. |
| 9,476,811 | B2 | 10/2016 | Mudrik et al. |
| 9,476,856 | B2 | 10/2016 | Pamula et al. |
| 9,513,253 | B2 | 12/2016 | Winger |
| 9,517,469 | B2 | 12/2016 | Shenderov et al. |
| 9,594,056 | B2 | 3/2017 | Fobel et al. |
| 9,851,365 | B2 | 12/2017 | Mousa et al. |
| 10,232,374 | B2 | 3/2019 | Jebrail et al. |
| 10,464,067 | B2 | 11/2019 | Jebrail et al. |
| 10,596,572 | B2 | 3/2020 | Hong et al. |
| 10,695,762 | B2 | 6/2020 | Jebrail et al. |
| 2002/0150683 | A1 | 10/2002 | Troian et al. |

(56) References Cited

U.S. PATENT DOCUMENTS

2003/0017551 A1 1/2003 Parthasarathy et al.
2003/0136451 A1 7/2003 Beebe et al.
2003/0194716 A1 10/2003 Knoll
2004/0171169 A1 9/2004 Kallury et al.
2004/0211659 A1 10/2004 Velev
2005/0115836 A1 6/2005 Reihs
2005/0133370 A1 6/2005 Park et al.
2005/0148091 A1 7/2005 Kitaguchi et al.
2005/0191759 A1 9/2005 Pedersen-Bjergaard et al.
2005/0220675 A1 10/2005 Reed et al.
2006/0091015 A1 5/2006 Lau
2006/0132542 A1 6/2006 Bruker et al.
2006/0231398 A1 10/2006 Sarrut et al.
2006/0272942 A1 12/2006 Sirringhaus
2007/0023292 A1 2/2007 Kim et al.
2007/0095407 A1 5/2007 Chen et al.
2007/0148763 A1 6/2007 Huh et al.
2007/0269825 A1 11/2007 Wang et al.
2008/0110753 A1 5/2008 Fourrier et al.
2008/0131904 A1 6/2008 Parce et al.
2008/0156983 A1 7/2008 Fourrier et al.
2008/0169197 A1 7/2008 McRuer et al.
2008/0185339 A1 8/2008 Delapierre et al.
2008/0210558 A1 9/2008 Sauter-Starace et al.
2008/0241831 A1 10/2008 Fan et al.
2008/0293051 A1 11/2008 Levy et al.
2009/0017197 A1 1/2009 Zhang et al.
2009/0017453 A1 1/2009 Maples et al.
2010/0022414 A1* 1/2010 Link .................. B01F 25/4336
506/18
2010/0025250 A1 2/2010 Pamula et al.
2010/0032293 A1 2/2010 Pollack et al.
2010/0048410 A1 2/2010 Shenderov et al.
2010/0087012 A1 4/2010 Shenderov
2010/0120130 A1 5/2010 Srinivasan et al.
2010/0130369 A1 5/2010 Shenderov et al.
2010/0136544 A1 6/2010 Agresti et al.
2010/0206094 A1 8/2010 Shenderov
2010/0236927 A1 9/2010 Pope et al.
2010/0236928 A1 9/2010 Srinivasan et al.
2010/0236929 A1 9/2010 Pollack et al.
2010/0270156 A1 10/2010 Srinivasan et al.
2010/0288368 A1 11/2010 Beebe et al.
2010/0311599 A1 12/2010 Wheeler et al.
2011/0024793 A1 2/2011 Jeon
2011/0076685 A1 3/2011 Moeller et al.
2011/0097763 A1 4/2011 Pollack et al.
2011/0104725 A1 5/2011 Pamula et al.
2011/0104747 A1 5/2011 Pollack et al.
2011/0107822 A1 5/2011 Bunner et al.
2011/0147216 A1 6/2011 Fan et al.
2011/0240471 A1 10/2011 Wheeler et al.
2011/0247934 A1 10/2011 Wang et al.
2011/0293851 A1 12/2011 Bollström et al.
2011/0303542 A1 12/2011 Srinivasan et al.
2011/0311980 A1 12/2011 Pollack et al.
2012/0000777 A1 1/2012 Garrell et al.
2012/0045748 A1 2/2012 Willson et al.
2012/0045768 A1 2/2012 Arunachalam et al.
2012/0149018 A1 6/2012 Dahlberg et al.
2012/0190027 A1 7/2012 Loeffert et al.
2012/0208705 A1 8/2012 Steemers et al.
2012/0208724 A1 8/2012 Steemers et al.
2012/0259233 A1 10/2012 Chan et al.
2012/0261264 A1 10/2012 Srinivasan et al.
2012/0289581 A1 11/2012 Chang et al.
2012/0325665 A1 12/2012 Chiou et al.
2013/0017544 A1 1/2013 Eckhardt et al.
2013/0018611 A1 1/2013 Sturmer
2013/0062205 A1 3/2013 Hadwen et al.
2013/0068622 A1 3/2013 Schertzer et al.
2013/0105318 A1 5/2013 Bhattacharya et al.
2013/0123979 A1 5/2013 Elliot et al.
2013/0157259 A1 6/2013 Choi et al.
2013/0168250 A1 7/2013 Fogleman et al.
2013/0171546 A1 7/2013 White et al.
2013/0177915 A1 7/2013 Too et al.
2013/0203606 A1 8/2013 Pollack et al.
2013/0215492 A1 8/2013 Steck et al.
2013/0217113 A1 8/2013 Srinivasan et al.
2013/0225450 A1 8/2013 Pollack et al.
2013/0270114 A1 10/2013 Feiglin
2013/0284956 A1 10/2013 Kwon
2013/0288254 A1 10/2013 Pollack et al.
2013/0293246 A1 11/2013 Pollack et al.
2013/0306480 A1 11/2013 Chang et al.
2014/0005066 A1 1/2014 Boles et al.
2014/0054174 A1 2/2014 Wang
2014/0124037 A1 5/2014 Foley
2014/0141409 A1 5/2014 Foley et al.
2014/0161686 A1 6/2014 Bort et al.
2014/0174926 A1 6/2014 Bort et al.
2014/0179539 A1 6/2014 Lohman et al.
2014/0194305 A1 7/2014 Kayyem et al.
2014/0216559 A1 8/2014 Foley
2014/0273100 A1 9/2014 Saito et al.
2014/0335069 A1 11/2014 Graham et al.
2015/0001078 A1 1/2015 Feiglin
2015/0021182 A1 1/2015 Rival et al.
2015/0075986 A1 3/2015 Cyril et al.
2015/0111237 A1 4/2015 Graham et al.
2015/0144489 A1 5/2015 Hoffmeyer et al.
2015/0148549 A1* 5/2015 Van Dam ............... G01N 35/10
422/63
2015/0205272 A1 7/2015 Yi et al.
2015/0212043 A1 7/2015 Pollack
2015/0258520 A1 9/2015 Griffiths et al.
2015/0267242 A1 9/2015 Foegeding et al.
2016/0068901 A1 3/2016 Eckhardt et al.
2016/0108432 A1 4/2016 Punnamaraju et al.
2016/0116438 A1 4/2016 Pamula et al.
2016/0129437 A1 5/2016 Kayyem et al.
2016/0161343 A1 6/2016 Smith et al.
2016/0175859 A1 6/2016 Yi et al.
2016/0199832 A1 7/2016 Jamshidi et al.
2016/0298173 A1 10/2016 Wang et al.
2016/0319354 A1 11/2016 Tocigl et al.
2016/0370317 A9 12/2016 Sudarsan et al.
2017/0315090 A1 11/2017 Wheeler et al.
2017/0354973 A1 12/2017 Sustarich et al.
2018/0095067 A1 4/2018 Huff et al.
2018/0099275 A1 4/2018 Wu et al.
2018/0120335 A1 5/2018 Mousa et al.
2018/0250672 A1 9/2018 Jamshidi et al.
2019/0168223 A1 6/2019 Soto-Moreno et al.
2019/0210026 A1 7/2019 Jebrail et al.
2020/0016597 A1 1/2020 Jebrail et al.
2020/0061621 A1 2/2020 Jebrail et al.
2020/0114359 A1 4/2020 Jebrail et al.
2020/0179933 A1 6/2020 Jebrail et al.
2020/0254458 A1 8/2020 Hong et al.
2021/0370304 A1 12/2021 Jebrail et al.
2022/0118455 A1 4/2022 Jebrail et al.

FOREIGN PATENT DOCUMENTS

CA 2881783 A1 2/2014
CN 1668527 A 9/2005
CN 101609063 A 12/2009
CN 102549804 A 7/2012
CN 102719526 A 10/2012
CN 102836653 A 12/2012
CN 103014148 A 4/2013
CN 103170383 A 6/2013
CN 103502386 A 1/2014
CN 104321 141 A 1/2015
CN 104995261 A 10/2015
CN 105764490 A 7/2016
CN 105849032 A 8/2016
DE 19949735 A1 5/2001
EP 2111554 B1 5/2013
GB 2533952 A 7/2016
JP 2002321449 A 11/2002
JP 2006220606 A 8/2006

(56) References Cited

FOREIGN PATENT DOCUMENTS

| | | | |
|---|---|---|---|
| JP | 2010500596 | A | 1/2010 |
| JP | 2010098133 | A | 4/2010 |
| JP | 2010515877 | A | 5/2010 |
| JP | 2010180222 | A | 8/2010 |
| JP | 2012525687 | A | 10/2012 |
| WO | WO2000/067907 | A2 | 11/2000 |
| WO | WO2001/025137 | A1 | 4/2001 |
| WO | WO2003/045556 | A2 | 6/2003 |
| WO | WO2004/074169 | A1 | 9/2004 |
| WO | WO2005/068993 | A1 | 7/2005 |
| WO | WO2005/118129 | A1 | 12/2005 |
| WO | WO2006/000828 | A2 | 1/2006 |
| WO | WO2006/102309 | A2 | 9/2006 |
| WO | WO2007/120240 | A2 | 10/2007 |
| WO | WO2007/123908 | A2 | 11/2007 |
| WO | WO2007/130284 | A2 | 11/2007 |
| WO | WO2007/136386 | A2 | 11/2007 |
| WO | WO2008/066828 | A2 | 6/2008 |
| WO | WO2009/026339 | A2 | 2/2009 |
| WO | WO2009/052348 | A2 | 4/2009 |
| WO | WO2009/111723 | A1 | 9/2009 |
| WO | WO2009/111769 | A2 | 9/2009 |
| WO | WO2009/140671 | A2 | 11/2009 |
| WO | WO2010/003188 | A1 | 1/2010 |
| WO | WO2010/006166 | A2 | 1/2010 |
| WO | WO2010/027894 | A2 | 3/2010 |
| WO | WO2010/042637 | A2 | 4/2010 |
| WO | WO2010/069977 | A1 | 6/2010 |
| WO | WO2010/091334 | A2 | 8/2010 |
| WO | WO2010/111265 | A1 | 9/2010 |
| WO | WO2011/002957 | A2 | 1/2011 |
| WO | WO2011/062557 | A1 | 5/2011 |
| WO | WO2012/061832 | A1 | 5/2012 |
| WO | WO2012/172172 | A1 | 12/2012 |
| WO | WO2013/006312 | A2 | 1/2013 |
| WO | WO2013/040562 | A2 | 3/2013 |
| WO | WO2013/090889 | A1 | 6/2013 |
| WO | WO2013/096839 | A1 | 6/2013 |
| WO | WO2013/116039 | A1 | 8/2013 |
| WO | WO2013/176767 | A1 | 11/2013 |
| WO | WO2014/078100 | A1 | 5/2014 |
| WO | WO2014/100473 | A1 | 6/2014 |
| WO | WO2014/106167 | A1 | 7/2014 |
| WO | WO2014/108185 | A1 | 7/2014 |
| WO | WO2014/1 83118 | A1 | 11/2014 |
| WO | WO2015/023745 | A1 | 2/2015 |
| WO | WO2015/077737 | A1 | 5/2015 |
| WO | WO2015/172255 | A1 | 11/2015 |
| WO | WO2015/172256 | A1 | 11/2015 |
| WO | WO2016/094589 | A1 | 6/2016 |
| WO | WO2016/128544 | A1 | 8/2016 |
| WO | WO2016/182814 | A2 | 11/2016 |
| WO | WO2016/197013 | A1 | 12/2016 |
| WO | WO2017/094021 | A1 | 6/2017 |

OTHER PUBLICATIONS

Gong et al., "All-electronic droplet generation on-chip with real-time feedback control for EWOD digital microfluidics," Lab Chip, 2008, 8, 898-906 (Year: 2008).*
Sadeghi et al., "On Chip Droplet Characterization: A Practical, High-Sensitivity Measurement of Droplet Impedance in Digital Microfluidics," Anal. Chem. 2012, 84, 1915-1923 (Year: 2012).*
11. Davoust et al., "Evaporation rate of drop arrays within a digital microfluidic system," Sensors and Actuators B 189 (2013) 157-164 (Year: 2013).*
Abdelgawad et al., All-terrain droplet actuation, Lab on a Chip, 8(5), pp. 672-677, May 2008.
Abdelgawad et al.; Low-cost, rapid-prototyping of digital microfluidics devices, Microfluidics and Nanofluidics, 4, pp. 349-355, Apr. 2008.
Abdelgawad et al.; Rapid prototyping in copper substrates for digital microfluidics, Adv. Mater., 19(1), pp. 133-137; Jan. 2007.
Abdelgawad et al; Hybrid microfluidics: a digital-to-channel interface for in-line sample processing and chemical separations, Lab on a Chip, 9(8), pp. 1046-1051, Apr. 2009.
Abdelgawad; Digital Microfluidics for Integration of Lab-on-a-Chip Devices (Doctoral dissertation); University of Toronto; ©2009.
Albrecht et al.; Laboratory testing of gonadal steroids in children; Pediatric Endocrinology Reviews; 5(suppl 1); pp. 599-607; Oct. 2007.
Analog Devices; 24-bit Capicitance-to-Digital converter with temperature sensor, AD7745/AD7746; Analog Devices; Norwood, MA; 28 pages; (year of pub. sufficiently earlier than effective US filing date and any foreign priority date) 2005.
Analog Devices; Extending the capacitive input range of AD7745/AD7746 Capicitance-to-Digital converter; Analog Devices; Norwood, MA; 5 pages; (year of pub. sufficiently earlier than effective US filing date and any foreign priority date) 2009.
Ankarberg-Lindren et al.; A purification step prior to commercial sensitive immunoassay is necessary to achieve clinical usefulness when quantifying serum 17 ?-estradiol in prepubertal children. Eur J Endocrinol, 158, pp. 117-124, Jan. 2008.
Armstrong et al.; A study of plasma free amino acid levels. II. Normal values for children and adults, Metabolism, 22(4), pp. 561-569, Apr. 1973.
Asiello et al.; Miniaturized isothermal nucleic acid amplification, a review; Lab Chip; 11(8); pp. 1420-1430; Apr. 2011.
Au et al., Integrated microbioreactor for culture and analysis of bacteria, algae and yeast, Biomedical Microdevices, 13(1), pp. 41-50, Feb. 2011.
Au et al.; A new angle on pluronic additives: Advancing droplets and understanding in digital microfluidics; Langmuir; 27; pp. 8586-8594; Jun. 2011.
Banatvala et al., Rubella, The Lancet. 363(9415), pp. 1127-1137, Apr. 2004.
Banér et al.; Signal amplification of padlock probes by rolling circle replication; Nuc. Acids Res.; 26(22); pp. 5073-5078; Nov. 1998.
Barany; Genetic disease detection and DNA amplification using cloned thermostable ligase; PNAS; 88(1); pp. 189-193; Jan. 1991.
Barbulovic-Nad et al., A microfluidic platform for complete mammalian cell culture, Lab on a Chip, 10(12), pp. 1536-1542; Jun. 2010.
Barbulovic-Nad et al.; Digital microfluidics for cell-based assays, Lab Chip, 8(4), pp. 519-526; Apr. 2008.
Baxendale et al.; Multistep synthesis using modular flow reactors: bestmann-ohira reagent for the formation of alkynes and triazoles; Angewandie Chemie International Edition; 48(22): pp. 4017-4021: May 2009.
Beattie et al.; Endogenous sex hormones, breast cancer risk, and tamoxifen response: an ancillary study in the NSABP Breast Cancer Prevention Trial P-1, J Natl Cancer Inst, 98(2), pp. 110-115, Jan. 2006.
Beaucage et al., The Functionalization of Oligonucleotides Via Phosphoramidite Derivatives,Tetrahedron, 49(10), pp. 1925-1963, Mar. 1993.
Belanger et al.; Omental and subcutaneous adipose tissue steroid levels in obese men. Steroids, 71(8), pp. 674-682, Aug. 2006.
Bergkvist et al., Improved chip design for integrated solid-phase microextraction in on-line proteomic sample preparation, Proteomics, 2(4), pp. 422-429, Apr. 2002.
Bi et al.; Dumbbell probe-mediated cascade isothermal amplification: A novel strategy for label-free detection of microRNAs and its application to real sample assay; Analytica Chimica Acta; 760; pp. 69-74; Jan. 2013.
Blankenstein et al.; Intratumorai levels of estrogens in breast cancer. J Steroid Biochem Mol Biol, 69(1-6), pp. 293-297, Apr.-Jun. 1999.
Bodamer et al.; Expanded newborn screening in Europe, Journal of Inherited Metabolic Disease, 30(4), pp. 439-444, Aug. 2007.
Bohlen et al.; Fluorometric assay of proteins in the nanogram range, Archives of Biochemistry and Biophysics, 155(1), pp. 213-220, Mar. 1973.
Boles et al.;Droplet-Based Pyrosequencing Using Digital Microfluidics; Analytical Chemistry; 83(22); pp. 8439-8447; Oct. 14, 2011.

(56) References Cited

OTHER PUBLICATIONS

Bollström et al.; A Multilayer Coated Fiber-Based Substrate Suitable for Printed Functionality; Organic Electronics; 10(5); pp. 1020-1023; Aug. 2009.
Bonneil et al., Integration of solid-phase extraction membranes for sample multiplexing: Application to rapid protein identification from gel-isolated protein extracts, Electrophoresis, 23(20), pp. 3589-3598, Oct. 2002.
Brassard et al.; Water-oil core-shell droplets for electrowetting-based digital microfluidic devices; Lab Chip; 8(8); pp. 1342-1349; Aug. 2008.
Brill et al., Synthesis of oligodeoxynucleoside phosphorodithioates via thioamidites, J. Am. Chem. Soc., 111(6), pp. 2321-2322, Mar. 1989.
Brivio et al.; Integrated microfluidic system enabling (bio)chemical reactions with on-line MALDI-TOF mass spectrometry, Anal. Chem., 74(16), pp. 3972-3976, Aug. 2002.
Burnstein; Aromatase inhibitor-associated arthralgia syndrome. Breast, 16(3), pp. 223-234, Jun. 2007.
Carlsson et al., Screening for genetic mutations, Nature, 380(6571), pp. 207, Mar. 1996.
Chace et al.; A biochemical perspective on the use of tandem mass spectrometry for newborn screening and clinical testing, Clinical Biochemistry, 38(4), pp. 296-309; Apr. 2005.
Chace et al.; Rapid diagnosis of maple syrup urine disease in blood spots from newborns by tandem mass spectrometry, Clinical Chemistry, 41(1), pp. 62-68, Jan. 1995.
Chace et al.; Rapid diagnosis of phenylketonuria by quantitative analysis for phenylalanine and tyrosine in neonatal blood spots by tandem mass spectrometry, Clinical Chemistry, 39(1), pp. 66-71; Jan. 1993.
Chace et al.; Use of tandem mass spectrometry for multianalyte screening of dried blood specimens from newborns, Clinical Chemistry, 49(11), pp. 1797-1817, Nov. 2003.
Chace; Mass spectrometry in newborn and metabolic screening: historical perspective and future directions, Journal of Mass Spectrometry, 44(2), pp. 163-170, Feb. 2009.
Chang et al.; Integrated polymerase chain reaction chips utilizing digital microfluidics; Biomedical Microdevices; 8(3); pp. 215-225; Sep. 2006.
Chatterjee et al.; Droplet-based microfluidics with nonaqueous solvents and solutions, Lab Chip, 6(2), pp. 199-206, Feb. 2006.
Chen et al.; Selective Wettability Assisted Nanoliter Sample Generation Via Electrowetting-Based Transportation; Proceedings of the 5th International Conference on Nanochannels, Microchannels and Minichannels (ICNMM); Puebla, Mexico; Paper No. ICNMM2007-30184; pp. 147-153: Jun. 18-20, 2007.
Chen et al.; The chemistrode: a droplet-based microfluidic device for stimulation and recording with high temporal, spatial, and chemical resolution; Proceedings of the National Academy of Sciences; 105(44); pp. 16843-16848; Nov. 2004.
Cheng et al., Paper-Based ELISA. Angewandte Chemie, 49(28). pp. 4771-4774, Jun. 2010.
Cheng et al.; Highly Sensitive Determination of microRNA Using Target-Primed and Branched Rolling-Circle Amplification; Angew. Chem.; 121(18); pp. 3318-3322; Apr. 2009.
Chetrite et al.; Estradiol inhibits the estrone sulfatase activity in normal and cancerous human breast tissues. Journal of Steroid Biochemistry and Molecular Biology, 104(3-5), pp. 289-292, May 2007.
Cho et al.; Creating, transporting, cutting, and merging liquid droplets by electrowetting-based actuation for digitai microfluidic circuits, J. MEMS 2003, 12(1), pp. 70-80, Feb. 2003.
Choi et al., Automated digital microfluidic platform for magnetic-particle-based immunoassays with optimization by design of experiments, Anal. Chem., 85(20), pp. 9638-9646; Oct. 2013.
Choi et al., Digital Microfluidics, Annu. Rev. Anal. Chem., 5, pp. 413-440, (Epub) Apr. 2012.
Christiansen; Hormone Replacement Therapy and Osteoporosis; Maturitas, 23, Suppl. pp. S71-S76, May 1996.
Chuang et al.; Direct Handwriting Manipulation of Droplets by Self-Aligned Mirror-EWOO Across a Dielectric Sheet; 19th IEEE International Conf. on Micro Electro Mechanical Systems (MEMS): Instanbul, Turkey; pp. 538-541; Jan. 22-26, 2066.
Cipriano et al.; The cost-effectiveness of expanding newborn screening for up to 21 inherited metabolic disorders using tandem mass spectrometry: results from a decision-analytic model, Value in Health, 10(2), pp. 83-97, Mar.-Apr. 2007.
Cooney et al.; Electrowetting droplet microfluidics on a single planar surface, Microfluid. Nanofluld., 2(5), pp. 435-446; Sep. 2006.
Coregenomics; How do SPRI beads work; 31 pages; retrieved from the internet (http://core-genomics.blogspot.com/2012/04/how-do-spri-beads-work.html); Apr. 28, 2012.
Cottam et al.; Accelerated synthesis of titanium oxide nanostructures using microfluidic chips; Lab on a Chip; 7(2); pp. 167-169; Feb. 2007.
Crabtree et al.; Microchip injection and separation anomalies due to pressure effects, Anal. Chem., 73(17), pp. 4079-4086, Sep. 2001.
Cunningham; Testosterone replacement therapy for late-onset hypogonadism. Nature Clinical Practice Urology, 3(5), pp. 260-267, May 2006.
Cuzick; Chemoprevention of breast cancer. Women's Health, 2(6), pp. 853-861, Nov. 2006.
Dahlin et al.; Poly(dimethyisiloxane)-based microchip for two-dimensional solid- phase extraction-capillary electrophoresis with an integrated electrospray emitter tip, Anal. Chem., 77(16), pp. 5356-5363, Aug. 2005.
Dambrot; of microchemistry and molecules: Electronic microfluidic device synthesizes biocompatible probes; 4 pages, retrieved from the internet (https://phys.org/news/2012-01-microchemistry-molecules-electronic-microfluidic-device.htm); Jan. 26, 2012.
Danton et al., Porphyrin profiles in blood, urine and faeces by HPLC/electrospray ionization tandem mass spectrometry. Biomedical Chromatography, 20(6-7), pp. 612-621, Jun.-Jul. 2006.
De Mesmaeker et al.; Comparison of rigid and flexible backbones in antisense oligonucleotides; Bioorganic & Medicinal Chem. Lett; 4(3); pp. 395-398; Feb. 1994.
Deligeorgiev et al.; Intercalating Cyanine Dyes for Nucleic Acid Detection; Recent Pat Mat Sci; 2(1); pp. 1-26; Jan. 2006.
Dempcy et al., Synthesis of a thymidyl pentamer of deoxyribonucleic guanidine and binding studies with DNA homopolynucleotides, Proc. Natl. Acad. Sci., 92(13), pp. 6097-6101, Jun. 1995.
Deng et al.; Rapid determination of amino acids in neonatal blood samples based on derivatization with isobutyl chloroformate followed by solid-phase micrextraction and gas chromatography/mass spectrometry. Rapid Communications in Mass Spectrometry, 18(1), pp. 2558-2564, Nov. 2004.
Denneulin et al.; Infra-red assisted sintering of inkjet printed silver tracks on paper substrates; J Nanopart Res; 13(9); pp. 3815-3823; Sep. 2011.
Dibbelt et al.: Determination of natural and synthetic estrogens by radioimmunoassay: Comparison of direct and extraction methods for quantification of estrone in human serum. Clinical Laboratory. 44(3), 137-143, Mar. 1998.
Dietzen et al.; National academy of clinical biochemistry laboratory medicine practice guidelines: follow-up testing for metabolic disease identified by expanded newborn screening using tandem mass spectrometry; executive summary, Clinical Chemistry, 55(9), pp. 1615-1626, Sep. 2009.
Diver et al.; Warning on plasma oestradiol measurement. Lancet, 330(8567), p. 1097, Nov. 1987.
Divino Filho et al.; Simultaneous measurements of free amino acid patterns of plasma, muscle and erythrocytes in healthy human subjects, Clinical Nutrition, 16(6), pp. 299-305, Dec. 1997.
Djerassi; Chemical birth of the pill. American Journal of Obstetrics and Gynecology, 194(1), pp. 290-298, Jan. 2006.
Dobrowolski et al.; DNA microarray technology for neonatal screening, Acta Paediatrica Suppl, 88(432), pp. 61-64, Dec. 1999.
Doebler et al.; Continuous-flow, rapid lysis devices for biodefense nucleic acid diagnostic systems; Journal of the Association for Laboratory Automation; 14(3); pp. 119-125; Jun. 2009.

(56) References Cited

OTHER PUBLICATIONS

Dong et al.; Highly sensitive multiple microRNA. detection based on fiourescence quenching of graphene oxide and isothermal strand-displacement polymerase reaction; Anai Chem; 84; pp. 4587-4593; Apr. 2012.
Dryden et al.; integrated digital microfluidic platform for voltammetric analysis; Analytical Chemistry; 85(18); pp. 8809-8816; Sep. 2013.
Duffy et al.; Rapid prototyping of microfluidic systems in Poly (dimethylsiloxane), Anal. Chem., 70(23), pp. 4974-4984, Dec. 1998.
Edgar et al.; Capillary electrophoresis separation in the presence of an immiscible boundary for droplet analysis, Anal. Chem., 78(19), pp. 6948-6954 (author manuscript, 15 pgs. ), Oct. 2006.
Egholm et al., PNA hybridizes to complementary oligonucleotides obeying the Watson-Crick hydrogen-bonding rules, Nature, 365(6446), pp. 566-568, Oct. 1993.
Egholm et al., Recognition of guanine and adenine in DNA by cytosine and thymine containing peptide nucleic acids (PNA), J. Am. Chem. Soc., 114(24), pp. 9677-9678; Nov. 1992.
Ehrmann; Polycystic ovary syndrome. New England Journal of Medicine; 352(12); pp. 1223-1236; Mar. 2005.
Ekstrom et al., Miniaturized solid-phase extraction and sample preparation for MALDI MS using a microfabricated integrated selective enrichment target, Journal of Proteome Research, 5(5), pp. 1071-1081, May 2006.
Ekstrom et al., Polymeric integrated selective enrichment target (ISET) forsolid-phase-based sample preparation in MALDI-TOF MS, Journal of Mass Spectrometry, 42(11), pp. 1445-1452, Nov. 2007.
Ekstrom et al.,On-chip microextraction for proteomic sample preparation of in-gel digests, Proteomics, 2(4), pp. 413-421, Apr. 2002.
El-Ali et al.; Cells on chips; Nature (2006) insight Review; 442(7101); pp. 403-411; Jul. 2006.
Fair; Digital microfluidics: Is a true lab-on-a-chip possible?; Microfuid. Nanofluld.; 3(3); pp. 245-281; Jun. 2007.
Falk et al.; Measurement of Sex Steroid Hormones In Breast Adipocytes: Methods and Implications; Cancer Epidemiol Biomarkers Prev: 17(8); pp. 1891-1895; Aug. 2008.
Fan et al.; Cross-scale electric manipulations of cells and droplets by frequency-modulated dielectrophoresis and electrowetting; Lab Chip; 8(8); pp. 1325-1331; Aug. 2008.
Fan et al.; Electrically Programmable Surfaces for Configurable Patterning of Cells; Advanced Materials; 20(8); pp. 1418-1423; Apr. 2008.
Fan et al.; Integrated barcode chips for rapid, multiplexed analysis of proteins in microliter quanties of blood; Nature Biotechnology; 26(12); pp. 1373-1378; 15 pages (Author Manuscript); Dec. 2008.
Faure et al.: Improved electrochemical detection of a transthyretin synthetic peptide in the nanomolar range with a two-electrode system integrated in a glass/PDMS microchip: Lab on a Chip; 14(15); pp. 2800-2805, Aug. 2014.
Fobel et al.; DropBot: An open-source digital microfluidic control system with precise control of electrostatic driving force and instantaneous drop velocity measurement; Applied Physics Letters; 102(19): 193513 (5 pgs.); May 2013.
Foote et al., Preconcentration of proteins on microfiuidic devices using porous silica membranes, Analytical Chemistry, 77(1), pp. 57-63, Jan. 2005.
Freire et al.; A practicai interface for microfluidics and nanoelectrospray mass spectrometry, Electrophoresis, 29(9), pp. 1836-1843, May 2008.
Fridley et al., Controlled release of dry reagents in porous media fortunable temporal and spatial distribution upon rehydration, Lab Chip, 12(21), pp. 4321-4327 (author manuscript, 14 pgs. ), Nov. 2012.
Fu et al., Controlled Reagent Transport in Disposable 2D Paper Networks, Lab. Chip, 10(7), pp. 918-920 (author manuscript, 9 pgs.), Apr. 2010.
Gao et al.; Unusual conformation of a 3'-thioformacetal linkage in a DNA duplex; J. Biomol. NMR; 4(1); pp. 17-34; Jan. 1994.
Gentili el al.; Analysis of free estrogens and their conjugates in sewage and river waters by solid-phase extraction then liquid chromatography-electrospray-tandem mass spectrometry. Chromatographia 56(1), pp. 25-32, Jul. 2002.
Gerasimova et al.; Fluorometric method for phenylalanine microplate assay adapted for phenylketonuria screening, Clinical Chemistry, 35(10), pp. 2112-2115, Oct. 1989.
Gong et al., All-Electronic Droplet Generation On-Chip With Real-Time Feedback Control for EWOD Digital Microfluidics, Lab Chip, 8(6), pp. 898-906 (author manuscript, 20 pgs. ), Jun. 2008.
Gong et al.; Portable digital microfluidics platform with active but disposable lab-on-chip; 17th IEEE International Conference on Micro Electro Mechanical Systems; Maastricht, Netherlands; pp. 355-358; Jan. 24-29, 2004.
Gong et al.; Two-dimensional digital microfluidic system by multilayer printed circuit board, 18th IEEE International Conference on Micro Electro Mechanical Systems (MEMS 2005); IEEE; pp. 726-729; Jan. 30-Feb. 3, 2005.
Goto et al.; Colorimetric detection of loop-mediated isothermal amplification reaction by using hydroxy naphthol blue; Biotechniques; 46(3); pp. 167-172; Mar. 2009.
Gottschlich et al.; Integrated microchip-device far the digestion, separation and postcolumn labeling of proteins and peptides, J. Chromatogr. B, 745(1), pp. 243-249, Aug. 2000.
Govindarajan et al., A low cost point-of-care viscous sample preparation device for molecular diagnosis in the developing world: an example of microfluidic origami, Lab Chip, 12(1), pp. 174-181, Jan. 2012.
Green et al.; Neonatal screening by DNA microarray: spots and chips, Nature Reviews Genetics, 6(2), pp. 147-151, Feb. 2005.
Hatch et al., Integrated preconcentration SDS-Page of proteins in microchips using photopatterned cross-linked polyacrylamide gels, Analytical Chemistry, 78(14), pp. 4976-4984, Jul. 2006.
He et al. (ed): Food microbiological inspection technology; Chapter 5: Modern food microbiological inspection technology: China Quality Inspection press; pp. 111-113; (English Translation included) Nov. 2013.
Henderson et al.; Estrogens as a cause of human cancer: The Richard and Hinda Rosenthal Foundation award lecture. Cancer Res, 48(2), pp. 246-253, Jan. 1988.
Hennequin et al.; Synthesizing microcapsules with controlled geometrical and mechanical properties with microfluidic double emulsion technology; Langmuir; 25(14); pp. 7857-7861; Jul. 2009.
Herdewijn et al.: 2'-5'-Oligoadenylates (2-5A) as Mediators of Interferon Action, Synthesis and Biological Activity of New 2-5A Analogues. E. De Clerg (ed.) Frontiers in Microbiology, 231-232, Springer, Dordrecht Jan. 1987.
Hertz et al.; Estrogen-progestogen combinations for contraception. Journal of the American Medical Association, 198(9), pp. 1000-1006, Nov. 1966.
Hong et al.; Three-dimensional digital microfluidic manipulation of droplets in oil medium; Scientific Reports; 5 (Article No. 10685); 5 pgs.; Jun. 2015.
Horn et al.; Oligonucleotides with alternating anionic and cationic phosphoramidate linkages: Synthesis and hybridization of stereo-uniform isomers; Tetrahedron Lett.; 37(6): pp. 743-746: Feb. 1996.
Hou et al.; Microfluidic devices for blood fractionation; Micromachines; 2(3); pp. 319-343; Jul. 20, 2011.
Huh et al.; Reversible Switching of High-Speed Air-Liquid Two-Phase Flows Using Electrowetting-Assisted Flow-Pattern Change, J. Am. Chem. Soc., 125, pp. 14678-14679; Dec. 2003.
Ihalainen et al; Application of paper-supported printed gold electrodes for impedimetric immunosensor development; Biosensors; 3(1); pp. 1-17; Mar. 2013.
Jacobson et al.; High-Speed Separations on a Microchip, Anal. Chem., 66(7), pp. 1114-1118, Apr. 1994.
Jacobson et al.; Precolumn Reactions with Electrophoretic Analysis Integrated on a Microchip, Anal. Chem., 66(23), pp. 4127-4132, Dec. 1994.

(56) References Cited

OTHER PUBLICATIONS

Jebrail et al., Combinatorial Synthesis of Peptidomimetics Using Digital Microfluidics, J. Flow Chem., 2(3), pp. 103-107; (online) Aug. 2012.
Jebrail et al., Let's get digital: digitizing chemical biology with microfluidics, Curr Opin. Chem. Biol., 14(5), 574-581, Oct. 2010.
Jebrail et al., Synchronized synthesis of peptide-based macrocycles by digital microfluidics, Angew. Chem. Int. Ed. Eng., 49(46), pp. 8625-8629, Nov. 2010.
Jebrail et al., World-to-digital-microfluidic interface enabling extraction and purification of RNA from human whole blood, Analytical Chemistry, 86(8), pp. 3856-3862, Apr. 2014.
Jebrail et al.; A Solvent Replenishment Solution for Managing Evaporation of Biochemical Reactions in Air-Matrix Digital Microfluidics Devices, Lab on a Chip, 15(1), pp. 151-158; Jan. 2015.
Jebrail et al.; Digital Microfluidic Method for Protein Extraction by Precipitation; Analytical Chemistry; 81(1); pp. 330-335; Jan. 2009.
Jebrail et al.; Digital Microfluidics for Automated Proteomic Processing, Journal of Visualized Experiments, 33 (e1603), 5 pgs., Nov. 2009.
Jebrail et al.; Digital microfluidics: a versatile tool for applications in chemistry, biology and medicine; Lab Chip; 12 (14); pp. 2452-2463; Jul. 2012.
Jemere et al., An integrated solid-phase extraction system for sub-picomolar detection, Electrophoresis, 23(20), pp. 3537-3544, Oct. 2002.
Jenkins et al., The biosynthesis of carbocyclic nucleosides; Chem. Soc. Rev.; 24(3); pp. 169-176; Jan. 1995.
Jessome et al.; Ion Suppression: A Major Concern in Mass Spectrometry. LC-GC North America, 24(5), pp. 498-510, May 2006.
Jia et al.; Ultrasensitive detection of microRNAs by exponential isothermal amplification; Angew. Chem. Int. Ed. Engl.; 49(32); pp. 5498-5501; Jul. 2010.
Jung et al.; Hybridization of Alternating Cationic/Anionic Oligonucleotides to RNA Segments; Nucleosides & Nucleotides; 13(6-7); pp. 1597-1605; Jul. 1994.
Kaaks et al.; Postmenopausal serum androgens, oestrogens and breast cancer risk: The European prospective investigation into cancer and nutrition. Endocrine-Related Cancer, 12(4), pp. 1071-1082. Dec. 2005.
Keng et al., Micro-chemical synthesis of molecular probes on an electronic microfluidic device,PNAS, 109(3), pp. 690-695; Jan. 2012.
Kiedrowski et al., Parabolic Growth of a Self-Replicating Hexadeoxynucleotide Bearing a 3'-5'-Phosphoamidate Linkage; Angew. Chemie Intl. Ed.; 30(4); pp. 423-426; Apr. 1991.
Kim et al.; Automated digital microfluidic sample preparation for next-generation DNA sequencing; JALA; Journal of the Association for Laboratory Automation; 16(6); pp. 405-414; Dec. 2011.
Kim et al., A Microfluidic DNA Library Preparation Platform for Next-Generation Sequencing, PLoS One, 8(7), Article ID: e68988; 9 pgs., Jul. 2013.
Kim et al.; Microfabricated Monolithic Multinozzle Emitters for Nanoelectrospray Mass Spectrometry; Anal Chem; 79(10); pp. 3703-3707; May 2007.
Koster et al.; Drop-based microfluidic devices for encapsulation of single cells; Lab on a Chip; 8(7); pp. 1110-1115; Jul. 2008.
Kralj et al.; Integrated continuous microfluidic liquid-liquid extraction. Lab on a Chip, 7(2), pp. 256-263, Feb. 2007.
Kutter et al., Solid phase extraction on microfiuidic devices, Journal of Microcolumn Separations, 12(2), pp. 93-97, Jan. 2000.
Kutter et al., Solvent-Programmed Microchip Open-Channel Electrochromatography, Analytical Chemistry, 70(15), pp. 3291-3297, Aug. 1998.
Labrie et al.; Androgen glucuronides, instead of testosterone, as the new markers of androgenic activity in women. The Journal of Steroid Biochemistry and Molecular Biology, 99(4-5), pp. 182-188, Jun. 2006.
Labrie; Intracrinoiogy. Molecular and Cellular Endocrinology, 78(3), pp. C113-C118, Jul. 1991.
Lamar et al.; Serum sex hormones and breast cancer risk factors in postmenopausal women. Cancer Epidemiol Biomarkers Prev, 12(4), pp. 380-383, Apr. 2003.
Langevin et al., A rapid and unblased method to produce strand-specific RNA-Seq libraries from small quantities of starting materiaRNA Biol., 10(4), pp. 502-515, (online) Apr. 2013.
Lawyer et al.; High-level expression, purification, and enzymatic characterization of full-length Thermus aquaticus DNA polymerase and a truncated form deficient in 5' to 3' exonuclease activity; Genome Res; 2(4); pp. 275-287; May 1993.
Lawyer et al.; Isolation, characterization, and expression in *Escherichia coli* of the DNA polymerase gene from Thermus aquaticus; J. Biol. Chem.; 264; pp. 6427-6437; Apr. 1989.
Lebrasseur et al.; Two-dimensional electrostatic actuation of droplets using a single electrode panel and development of disposable plastic film card; Sensors and Actuators A; 136(1); pp. 368-386; May 2007.
Lee et al.; Electrowetting and electrowetting-on-dielectric for microscale liquid handling, Sens. Actuators A, 95(2), pp. 259-268, Jan. 2002.
Lee et al.; Removal of bovine serum albumin using soiid-phase extraction with in-situ polymerized stationary phase in a microfluidic device; Journal of Chromatography A; 1187(1-2): pp. 11-17; Apr. 2008.
Lee et al.; Surface-Tension-Driven Microactuation Based on Continuous Electrowetting; J. Microelectromechanical Systems; 9(2); pp. 171-180; Jun. 2000.
Letsinger et al., Cationic oligonucleotides, J. Am. Chem. Soc., 110(13), pp. 4470-4471, Jun. 1988.
Letsinger et al., Effects of pendant groups at phosphorus on binding properties of d-ApA analogues, Nucl. Acids Res., 14(8), pp. 3487-3499, Apr. 1986.
Letsinger et al., Phosphoramidate analogs of oligonucleotides. J. Org. Chem., 35(11), pp. 3800-3803, Nov. 1970.
Lettieri et al., A novel microfluidic concept for bioanalysis using freely moving beads trapped in recirculating flows, Lab on a Chip, 3(1), pp. 34-39, Feb. 2003.
Levy et al.; Genetic screening of newborns, Annual Review of Genomics and Human Genetics, 1, pp. 139-177, Sep. 2000.
Li et al., A perspective on paper-based microfluidics: Current status and future trends, Biomicrofluidics, 6(1), pp. 011301 (13 pgs), Mar. 2012.
Li et al., Application of microfluidic devices to proteomics research: identification of trace-level protein digests and affinity capture of target peptides. Molecular & cellular Proteomics, 16(2), pp. 157-168, Feb. 2002.
Li et al., Paper-based microfluidic devices by plasma treatment, Anal. Chem., 80(23), pp. 9131-9134, Nov. 2008.
Li et al.; A Low-Cost and High resolution droplet position detector for an intelligent electrowetting on dielectric device; Journal of Lab. Automation 2015; 20(6); pp. 663-669; Dec. 2015.
Li et al.; One-step ultrasensitive detection of microRNAs with loop-mediated isothermal amplification (LAMP); Chem Commun; 47(9); pp. 2595-2597; Mar. 2011.
Li et al.; Test structure for characterizing low voltage coplanar EWOD system; IEEE Transaction on Semiconductor Manufacturing; IEEE Service Center; Piscataway, NJ.; 22(1); pp. 88-95; Feb. 4, 2009.
Liana et al.; Recent Advances in Paper-Based Sensors; Sensors; 12(9); pp. 11505-11526; Aug. 2012.
Link et al.; Electric Control of Droplets in Microfluidic Devices; Angew Chem Int Ed Engl; 45(16); pp. 2556-2560; Apr. 2006.
Liu et al., Three-dimensional paper microfluidic devices assembled using the principles of origami, JACS, 133(44), pp. 17564-17566, Nov. 2011.
Liu et al.; Attomolar ultrasensitive microRNA detection by DNA-scaffolded silver-nanocluster probe based on isothermal amplification; Anal Chem; 84(12); pp. 5165-5169; Jun. 2012.
Lizard et al.; Mutation detection and single-molecule counting using isothermal rolling-circle amplification; Nat. Genet.; 19(3); pp. 225-232; Jul. 1998.
Locascio et al.; Surface chemistry in polymer microfluidic systems; in Lab-on-a-Chip; Elsevier Science; 1st Ed.; pp. 65-82; Oct. 2003.

(56) References Cited

OTHER PUBLICATIONS

Loeber; Neonatal screening in Europe; the situation in 2004, Journal of Inherited Metabolic Disease, 30(4), pp. 430-438, Aug. 2007.
Lohman et al.; Efficient DNA ligation in DNA-RNA hybrid helices by Chloreila virus DNA ligase; Nucleic Acids Research; 42(3); pp. 1831-1844; Nov. 2013.
Luk et al.; Pluronic Additives: A Solution to Sticky Problems in Digital Microfluidics, Langmuir, 24(12), pp. 6382-6389, Jun. 2008.
Luk et al.; A digital microfluidic approach to proteomic sample processing; Analytical Chemistry; 81(11); pp. 4524-4530; Jun. 2009.
Mag et al., Synthesis and selective cleavage of an oligodeoxynucleotide containing a bridged internucleotide 5'-phosphorothioate linkage, Nucleic Acids Res., 19(7), pp. 1437-1441, Apr. 1991.
Mais et al.; A solvent replenishment solution for managing evaporation of biochemical reactions in air-matrix digital microfluidics devices; Lab on a Chip; 15(1); pp. 151-158; Jan. 2015.
Makamba et al.; Surface modification of poly(dimethyisiloxane) microchannels; Electrophoresis; 24(21); pp. 3607-3619; Nov. 2003.
Malloggi et al.; Electrowetting—A versatile tool for controlling microdrop generation, Eur. Phys. J. E, 26(1), pp. 91-96, May 2008.
Mandl et al.; Newborn screening program practices in the United States: notification, research, and consent, Pediatrics, 109(2), pp. 269-273, Feb. 2002.
Maroney et al.; A Rapid, quantitative assay for direct detection of microRNAs and other small RNAs using splinted ligation; RNA; 13(6); pp. 930R936; Jun. 2007.
Maroney et al.; Direct detection of small RNAs using splinted ligation; Nat. Protocols3(2); pp. 279-287; Jan. 2008.
Marre et al.; Synthesis of micro and nanostructures in microfluidic systems; Chemical Society Reviews; 39(3); pp. 1183-1202; Mar. 2010.
Martinez et al., Simple Telemedicine for Developing Regions: Camera Phones and Paper-Based Microfluidic Devices for Real-Time, Off-Site Diagnosis, Anal. Chem., 80(10), pp. 3699-3707, May 2008.
Martinez et al., Three-dimensional microfluidic devices fabricated in layered paper and tape, PNAS, 105(50), pp. 19606-19611, Dec. 2008.
Martinez et al.; Patterned paper as a platform for inexpensive low-volume, portable bioassays, Angewandte Chemie, 46(8), pp. 1318-1320, Feb. 2007.
Martinez-Sanchez et al.; MicroRNA Target Identification—Experimental Approaches; Biology; 2; pp. 189-205; Jan. 2013.
Matern et al.; Reduction of the false-positive rate in newborn screening by implementation of MS/MS-based second-tier tests: the Mayo Clinic experience (2004-2007), Journal of inherited Metabolic Disease, 30(4), pp. 585-592, Aug. 2007.
Mauney, Thermal Considerations for Surface Mount Layouts, in Texas Instruments Portable Power Supply Design Seminar, 16 pgs., 2006.
Mega; Heterogenous ion-exchange membranes RALEX; 3 pgs.; retrieved Mar. 1, 2016 from the internet: http://www.mega.cz/heterogenous-ion-exchange-membranes-ralex.html.
Meier et al., The photochemistry of stilbenoid compounds and their role in materials technology, Chem. Int. Ed. Engl., 31(11), pp. 1399-1420, Nov. 1992.
Mellors et al.; Fully Integrated Glass Microfluidic Device for Performing High-Efficiency Capillary Electrophoresis and Electrospray Ionization Mass Spectrometry, Analytical Chemistry, 80(18), pp. 6881-6887 (Author Manuscript, 18 pgs), Sep. 2008.
Michigan Dept. of Community Health; Specimen collection procedure from Michigan Newborn Screening Program, 37 pgs., (retrieved Feb. 9, 2017 online; http://web.archive.org/web/20100715000000*/http://www.michigan.gov/documents/Bloodco2_60773_7.pdf) Jul. 2009.
Miller et al.; A digital microfluidic approach to homogeneous enzyme assays, Anal. Chem., 80(5), pp. 1614-1619, Mar. 2008.
Millington et al.; Digital Microfluidics: A Future Technology in the Newborn Screening Laboratory?, Seminars in Perinatology, 34(2), pp. 163-169 (Author Manuscript, 14 pgs.), Apr. 2010.
Millington et al.; Digital Microfluidics: A novel piatform for multiplexed detection of LSDs with potential for newborn screening (conference presentation); Oak Ridge Conference; 15 pgs.; 2009.
Millington et al.; Tandem mass spectrometry a new method for acylcamitine profiling with potential for neonatal screening for inborn errors of metabolism, Journal or Inherited Metabolic Disease, 13(3), pp. 321ý324, May 1990.
Millington et al.; The Analysis of Diagnostic Markers of Genetic Disorders in Human Blood and Urine Using Tandem Mass Spectrometry With Liquid Secondary ion Mass Spectrometry, International Journal of Mass Spectrometry, 111, pp. 211-228, Dec. 1991.
Miralles et al.; A Review of Heating and Temperature Control in Microfiuidic Systems: Techniques and Applications; Diagnostics; 3; pp. 33-67; Jan. 2013.
Mitchell et al.; Circulating microRNAs as stable blood-based markers for cancer detection; Proc Nat Acad Sci; 105(30); pp. 10513-10518; Jul. 2008.
Moon et al.; An integrated digital microfluidic chip for multiplexed proteomic sample preparation and analysis by MALDI-MS. Lab Chip, 6(9), pp. 1213-1219, Sep. 2006.
Moqadam et al.; The Hunting of Targets: Challenge in miRNA Research; Leukemia; 27(1); pp. 16-23; Jan. 2013.
Mousa et al.; Droplet-scale estrogen assays in breast tissue, blood, and serum, Science Transiationai Medicine, 1(1), 6 pgs., Oct. 2009.
Murran et al.; Capacitance-based droplet position estimator for digitai microfluidic devices; Lab Chip;12(11); pp. 2053-2059; May 2012.
Nakamura et al.; Simple and accurate determination of CYP2D6 gene copy number by a loop-mediated isothermal amplification method and an electrochemical DNA chip; Clinica Chimica Acta; 411(7-8); pp. 568-573; Apr. 2010.
Nelson et al., Incubated protein reduction and digestion on an EWOD digital microfluidic chip for MALDI-MS, Analytical Chemistry, 82(23), pp. 9932-9937, Dec. 2010.
Newborn Screening Ontario, The newborn screening ontario unsatisfactory sample indicator (educational resource), 3 pgs., retrieved online: https://www.newbornscreening.on.ca/en/health-care-providers/submitters/report-cards/nso_unsatisfatory_sample_indicator_jan_2017, (web address was available to applicant(s) at least as of Jan. 2010).
Ng et al., Digital microfluidic magnetic separation for particle-based immunoassays, Anal. Chem., 84(20), 8805-8812, Oct. 2012.
Nilsson et al.; RNA-templated DNA ligation for transcript analysis; Nucl. Acid Res.; 29(2); pp. 578-581; Jan. 2001.
Njiru; Loop-Mediated Isothermal Amplification Technology: Towards Point of Care Diagnostics; PLoS; 6(6); pp. e1572 (4 pgs.); Jun. 2012.
Notomi et al.; Loop-mediated isothermal amplification of DNA; Nucleic Acid Research; 28(12); p. e63 (7 pgs.); Jun. 2000.
Okubo et al.; Liquid-liquid extraction for efficient synthesis and separation by utilizing micro spaces. Chemical Engineering Science, 63(16), pp. 4070-4077, Aug. 2008.
Oleschuk et al., Trapping of bead-based reagents within microfluidic systems: On-chip solid-phase extraction and electrochromatography, Analytical Chemistry, 72(3), pp. 585-590, Feb. 2000.
Padilla et al.; Newborn screening in the Asia Pacific region, Journal of Inherited Metabolic Disease, 30(4), pp. 490-506, Aug. 2007.
Paik et al., Coplanar digital microfluidics using standard printed circuit board processes, in Proceedings 9th Int'l Conf Miniaturized Systems for Chemistry and Life Sciences (MicroTAS 2005), Boston, MA, USA, pp. 566-568, Oct. 9-13, 2005.
Paneri et al.; Effect of change in ratio of electrode to total pitch length in EWOD based microfluidic system; InComputer Applications and Industrial Electronics (ICCAIE); 2010 International Conference; pp. 25-28; Dec. 5, 2010.
Parida et al.; Rapid detection and differentiation of Dengue virus serotypes by e reel-time reverse transcription-loop-mediated isothermal amplification assay; J Clinical Microbiology; 43(6); pp. 2895-2903; Jun. 2005.
Pauwels et al., Biological-Activity of New 2-5a Analogs, Chemica Scripta, 26(1), pp. 141-145, Mar. 1986.

(56) References Cited

OTHER PUBLICATIONS

Peltonen et al.; Printed electrodes on tailored paper enable electrochemical functionalization of paper; TAPPI Nanotechnology Conference; Espoo, Finland; 20 pgs.; Sep. 2010.
Peterschmitt et al.; Reduction of false negative results in screening of newborns for homocystinuria, New England Journal of Medicine, 341(21), 1572-1576, Nov. 1998.
Petersen et al., On-chip electro membrane extraction, Microfluidics and Nanofluidics, 9(4), pp. 881-888, Oct. 2010.
Pitt et al.; Hormone replacement therapy for osteoporosis. Lancet, 335(8695), p. 978, Apr. 1990.
Pollack et al.; Electrowetting-based actuation of droplets for integrated microfluidics; Lab on a Chip; 2(2); pp. 96-101; May 2002.
Pollack et al.; Electrowetting-based actuation of liquid droplets for microfluidic applications, Appl. Phys. Lett., 77(11), pp. 1725-1726, Sep. 2000.
Provincial Health Services Authority (British Columbia Perinatal Health Program), Perinatal Services BC Neonatal Guideline 9; Newborn Screening, 29 pgs., (retrieved Feb. 9, 2017 online: http://www.perinatalservicesba.ca/health-professionals/guidelnes-standards/newborn) guideline revised: Dec. 2010.
Rahhal et al.; The impact of assay sensitivity in the assessment of diseases and disorders in children. Steroids, 73(13), pp. 1322-1327, Dec. 2008.
Rashad; Clinical applications of tandem mass spectrometry: ten years of diagnosis and screening for inherited metabolic diseases, Journal of Chromatography B: Biomedical Sciences and Applications, 758(1), pp. 27-48, Jul. 2001.
Rashed et al.; Diagnosis of inborn errors of metabolism from blood spots by acylcamitines and amino acids profiling using automated electrospray tandem mass spectrometry, Pediatric Research, 38(3), 324-331, Sep. 1995.
Rawls, Optimistic About Antisense: Promising clinical results and chemical strategies for further improvements delight antisense drug researchers: Chemical & Engineering News; 75(22); pp. 35-39; Jun. 2, 1997.
Ren et al., Automated on-chip droplet dispensing with volume control by electro-wetting actuation and capacitance metering, Sens. Actuator B Chem., 98(2-3), pp. 319-327, Mar. 2004.
Ren et al.; Design and testing of an interpolating mixing architecture for electrowetting-based dropiet-on-chip chemical dilution; 12th International Conference on Transducers, Solid-State Sensors, Actuators and Microsystems; vol. 2; Boston, MA, USA; pp. 619-622; Jun. 8-12, 2003.
Ro et al.; Poly (dimethylsiloxane) microchip for precolumn reaction and micellar electrokinetic chromatography of biogenic amines, Electrophoresis, 23(7-8), pp. 1129-1137, Apr. 2002.
Roman et al.; Fully integrated microfluidic separations systems for biochemical analysis, J. Chromatogr. A, 1168(1-2), pp. 170-188, Oct. 2007.
Roman et al.; Sampling and Electrophoretic Analysis of Segmented Flow Streams in a Microfiuidic Device, Anal. Chem., 80(21), pp. 8231-8238 (author manuscript, 19 pgs.), Nov. 2008.
Sabourin et al.; Interconnection blocks: a method for providing reusable, rapid, multiple, aligned and planar microfluidic interconnections; Journal of Micromechanics and Microengineering; 19(3); 10 pages; doi:10.1088/0960-1317/19/3/035021; Feb. 18, 2009.
Sadeghi et al.; On Chip Droplet Characterization: A Practical, High-Sensitivity Measurement of Droplet Impedance in Digital Microfluidics; Anal. Chem.; 84(4); pp. 1915-1923; Feb. 2012.
Sahai et al.; Newborn screening, Critical Reviews in Clinical Laboratory Sciences, 46(2), pp. 55-82, (online) Mar. 2009.
Samsi et al.; A Digital Microfluidic Electrochemical Immunoassay; Lab on a Chip; 14(3); pp. 547-554; Feb. 2014.
Sanghvi & Cook (Ed.); Carbohydrate Modifications in Antisense Research; Chapters 2 and 3, American Chemical Society, Washington DC; (207th National Meeting of the American Chemical Society Mar. 13-17, 1994, San Jose, CA); Dec. 1994.
Sanghvi & Cook (Ed.); Carbohydrate Modifications in Antisense Research; Chapters 6 and 7, American Chemical Society, Washington DC; (207th National Meeting of the American Chemical Society Mar. 13-17, 1994, San Jose, CA); Dec. 1994.
Santen et al.; Superiority of gas chromatography/tandem mass spectrometry assay (GC/MS/MS) for estradiol for monitoring of aromatase inhibitor therapy. Steroids. 72(8), pp. 666-671, Jul. 2007.
Sasano et al.; From Endocrinology to Intracrinoiogy. Endocr Pathol, 9(1), pp. 9-20, Spring 1998.
Satoh et al.; Electrowetting-based valve for the control of the capillary flow, J. Appl. Phys., 103(3), 034903, Feb. 2008.
Satoh et al.; On-chip microfluidic transport and mixing using electrowetting and incorporation of sensing functions, Anal. Chem., 77(21), pp. 6857-6863, Nov. 2005.
Sawai et al., Synthesis and properties of oligoadenylic acids containing 27-5? phosphoramide linkage, Chem. Lett., 13(5), pp. 805-808, May 1984.
Schertzer et al.; Using capacitance measurements in EWOD devices to identify fluid composition and control droplet mixing; Sens. Actuators B; 145(1); pp. 340-347; Mar. 2010.
Scriver_Commentary; A Simple Phenylalanine Method for Detecting Phenylketonuria in Large Populations of Newborn infants by Guthrie et al., Pediatrics, 32(3), 338-343, Sep. 1963.
Shah et al., On-demand droplet loading for automated organic chemistry on digital microfluidics, Lab Chip, 13(14), pp. 2785-2795, Jul. 2013.
Shamsi et al; A digitai microfluidic electrochemical immunoassay; Lab on a Chip; 14(3); pp. 547-554; (year of pub. sufficiently earlier than effective US filing date and any foreign priority date) 2014.
Shih et al., A feedback control system for high-fidelity digital microfluidics, Lab Chip, 11(3), pp. 535-540, Feb. 2011.
Simpson et al.; Estrogen—the Good, the Bad, and the Unexpected. Endocr Rev, 26(3), pp. 322-330; May 2005.
Sinha et al., A Versatile Automated Platform for Micro-scale Cell Stimulation Experiments, J. Vis. Exp., e50597, 8 pgs., Aug. 2013.
Sinton et al.; Electroosmotic velocity profiles in microchannels, Colloids Surf. A, 222(1-3), pp. 273-283, Jul. 2003.
Skendzel, Rubella immunity; Defining the level of protective antibody, Am. J. Clin. Pathol., 106(2), 170-174, Aug. 1996.
Smith et al; Diagnosis and Management of Female Infertility. Journal of the American Medical Association 290(13), pp. 1767-1770, Oct. 2003.
Sooknanan et al., Nucleic Acid Sequence-Based Amplification, Ch. 12; Molecular Methods for Virus Detection (1st Ed.), Academic Press, Inc., pp. 261-285; Jan. 1995.
Sprinzl et al., Enzymatic incorporation of ATP and CTP analogues into the 3' end of tRNA, Eur. J. Biochem., 81(3), pp. 579-589, Dec. 1977.
Srinivasan et al.; An integrated digital microfluidic lab-on-a-chip for clinical diagnostics on human physiological fluids, Lab Chip, 4(4), pp. 310-315, Aug. 2004.
Stanczyk et al.; Standardization of Steroid Hormone Assays Why, How, and When?, Cancer Epidemiol Biomarkers Prev, 16(9), pp. 1713-1719, Sep. 2007.
Steckl et al.; Flexible Electrowetting and Electrowetting on Flexible Substrates; Proc. SPIE 7956; Advances in Display Technologies; and E-papers and Flexible Displays: 795607 (6 pgs.); Feb. 2011.
Stegink et al.; Plasma amino acid concentrations and amino acid ratios in normal adults and adults heterozygous for phenylketonuria ingesting a hamburger and milk shake meal, American Journal of Clinical Nutrition, 53(3), pp. 670-675, Mar. 1991.
Sun et al.; Rapid and direct microRNA quantification by an enzymatic luminescence assay; (author manuscript; 17 pgs.) Analytical Biochemistry; 429(1); pp. 11-17; Oct. 2012.
Svoboda et al.; Cation exchange membrane integrated into a microfluidic device; Microelectronic Engineering; 86; pp. 1371-1374; Apr.-Jun. 2009.
Szarewski et al.; Contraception. Current state of the art. British Medical Journal, 302(6787), pp. 1224-1226, May 1991.
Szymczak et al.; Concentration of Sex Steroids in Adipose Tissue after Menopause. Steroids, 63(5-6), pp. 319-321, May/Jun. 1998.
Tachibana et al.; Application of an enzyme chip to the microquantification of L-phenylalanine, Analytical Biochemistry, 359(1), pp. 72-78, Dec. 2006.

(56) References Cited

OTHER PUBLICATIONS

Tan et al.; A lab-on-a-chip for detection of nerve agent sarin in blood; Lab Chip; 8(6); pp. 885-891; Jun. 2008.
Teh et al.; Droplet microfluidics, Lab Chip, 8(2), pp. 198-220, Feb. 2008.
Theberge et al.; Microdroplets in microfluidics: an evolving platform for discoveries in chemistry and biology; Angewandte Chemie International Edition; 49(34); pp. 5846-5868; Aug. 2010.
Therrell et al.; Newborn screening in North America, Journal of Inherited Metabolic Disease, 30(4), pp. 447-465, Aug. 2007.
Tian et al., Printed two-dimensional micro-zone plates for chemical analysis and ELISA, Lab on a Chip, 11(17), pp. 2869-2875, Sep. 2011.
Tobjörk et al., IR-sintering of ink-jet printed metal-nanoparticles on paper, Thin Solid Films, 520(7), pp. 2949-2955, Jan. 2012.
Tomita et al.; Loop-mediated isothermal amplification (LAMP) of gene sequences and simple visual detection of products; Nature Protocols; 3(5); pp. 877-882; (online) Apr. 2008.
Torkkeli; Droplet microfluidics on a planar surface; VTT Technical Research Centre of Finland; Publications 504; 214 pages (Dissertation); Oct. 2003.
Turgeon et al.; Combined Newborn Screening for Succinylacetone, Amino Acids, and Acylcarnitines in Dried Blood Spots, Clinical Chemistry, 54(4), pp. 657-664, Apr. 2008.
Udenfriend et al.; Fluorescamine: a reagent for assay of amino acids, peptides, proteins, and primary amines in the picomole range, Science, 178(4063), pp. 871-872, Nov. 1972.
Unger et al.; Monolithic microfabricated valves and pumps by multilayer soft lithography, Science, 288(5463), pp. 113-116, Apr. 2000.
Univ. of Maryland—Baltimore Washington Medical Center; Plasma amino acids, 6 pgs., retrieved Feb. 10, 2017 from: http://www.mybwmc.org/library/1/003361, Web address available to applicant(s) at least as of Jan. 2010.
Verkman; Drug Discovery in Academia; Am J Physiol Cell Physiol; 286(3); pp. C465-C474; Feb. 2004.
Walker et al.; A Chemiluminescent DNA Probe Test Based on Strand Displacement Amplification (Chapter 15); Molecular Methods for Virus Detection (1st Ed.), Academic Press. Inc., pp. 329-349; Jan. 1995.
Walker et al.; A passive pumping method for microfluidic devices, Lab Chip, 2 (3), pp. 131-134, Aug. 2002.
Wang et al., Paper-based chemiluminescence ELISA: lab-on-paper based on chitosan modified paper device and, Biosens. Bioelectron., 31(1), pp. 212-218, Jan. 2012.
Wang et al., Simple and covalent fabrication of a paper device and its application in sensitive chemiluminescence immunoassay, Analyst, 137(16), pp. 3821-3827, Aug. 2012.
Wang et al.; An integrated microfluidic device for large-scale in situ click chemistry screening; Lab on a Chip; 9(16); 9(16); pp. 2281-2285; 9 pages (Author Manuscript); Aug. 2009.
Wang et al.; Highly sensitive detection of microRNAs based on isothermal exponential amplification-assisted generation of catalytic G-quadruplexDNAzyme; Biosensors and Bioelectronics. 42; pp. 131-135; Apr. 2013.
Washburn et al.; Large-scale analysis of the yeast proteome by multidimensional protein identification technology, Nat. Biotechnol., 19(3), pp. 242-247, Mar. 2001.
Watson et al.; Multilayer hybrid microfluidics: a digital-to-channel interface for sample processing and separations; Anal. Chem.; 82(15); pp. 6680-6686; Aug. 2010.
Wheeler et al.; Electrowetting-Based Microfluidics for Analysis of Peptides and Proteins by Matrix-Assisted Laser Desorption/Ionization Mass Spectrometry; Anal Chem; 76(16); pp. 4833-4838; Aug. 2004.
Wheeler; Chemistry. Putting electrowetting to work; Science; 322(5901); pp. 539-540; Oct. 2008.
Wlodkowic et al.; Tumors on chips: oncology meets microfluidics; Current opinion in Chemical Biology; 14(5); pp. 556-567; Oct. 2010.
Wu et al.: Design, Simulation and Fabrication of Electrowetting-Based Actuators for Integrated Digital Microfluidics; Proceedings of the 1st IEEE International Conference on Nano/Micro Engineered and Molecular Systems; Zhuhai, China; pp. 1097-1190; Jan. 18-21, 2006.
Wu et al.; Electrophoretic separations on microfluidic chips, J. Chromatogr. A, 1184(1-2), pp. 542-559, Mar. 2008.
Yan et al., A microfiuidic origami electrochemiluminescence aptamer-device based on a porous Au-paper electrode and a phenyleneethynylene derivative, Chem. Common. (Camb), 49(14), pp. 1383-1385, Feb. 2013.
Yan et al., Paper-based electrochemiluminescent 3D immunodevice for lab-on-paper, specific, and sensitive point-of-care testing, Chem.—Eur. J., 18(16), pp. 4938-4945, Apr. 2012.
Yi et al.; Spangler et al., Eds; Channel-to-droplet extractions for on-chip sample preparation, in Proceedings of Solid-State Sensor, Actuator and Microsystems Workshop, pp. 128-131, Jun. 2006.
Yin et al.; One-step, multiplexed fluorescence detection of microRNAs based on duplex-specific nuclease signal amplification; J. American Chem. Soc.; 134(11); pp. 5064-5067; Mar. 2012.
Yoon et al.; Preventing Biomolecular Adsorption in Electrowetting-Based Biofluidic Chips; Anal Chem; 75; pp. 5097-5102; Aug. 2003.
Yoon; Open-Surface Digital Microfluidics; The Open Biotechnology Journal; 2(1); pp. 94-100; Apr. 2008.
Young et al.; Calculation of DEP and EWOD Forces for Application in Digital Microfluidics, J. Fluids Eng., 130(8), pp. 081603-1-081603-9, Jul. 2008.
Yu et al., Monolithic porous polymer for on-chip solid-phase extraction and preconcentration prepared by photoinitiated in situ polymerization within a microfluidic device, Analytical Chemistry , 73(21), pp. 5088-5096, Nov. 2001.
Yu et al., Preparation of monolithic polymers with controlled porous properties for microfluidic chip applications using photoinitiated free-radical polymerization, Journal of Polymer Science, Part A: Polymer Chemistry, 40(6), pp. 755-769, Mar. 2002.
Yu et al.; A plate reader-compatible microchannel array for cell biology assays; Lab Chip; 7(3); pp. 388-391; Mar. 2007.
Yu et al.; Microfabrication of a digital microfluidic platform integrated with an on-chip electrochemical cell; Journal of Micromechanics and Micromgineering; 23(9); pp. 10 pages; doi:10.1088/0960-1317/23/9/095025; Aug. 2013.
Yu et al.; Microfabtrication of a digital microfiuidic platform integrated with an on-chip electrochemical cell; Journal of Micromechanics and Microengineering; 23(9); doi:10.1088/0960-1317/23/9/095025, 10 pages; Aug. 28, 2013.
Yu et al.; Parallel-plate lab-on-chip electrochemical analysis; Journal of Micromechanics and Microengineering; 24(1); 7 pages; doi: 10.1088/0960-1317/24/1/015020; Dec. 16, 2013.
Yue; Undergraduate Chemistry experiment (11); Hunan Normal University Press; First Edition; p. 96; (Machine Translation included); Oct. 2008.
Yung et al.; Micromagnetic-microfluidic blood cleansing devices; Lab on a Chip; 9(9); pp. 1171-1177; May 2009.
Zaffanello et al.; Multiple positive results during a neonatal screening program: a retrospective analysis of incidence, clinical implications and outcomes, Journal of Perinatal Medicine, 33(3), pp. 246-251, May 2005.
Zhang et al.; Multiplexed detection of microRNAs by tuning DNA-scaffolded silver nanoclusters; Analyst; 138(17); pp. 4812-4817; Sep. 2013.
Zhang et al.; The permeability characteristics of silicone rubber: In Proceedings of 2006 SAMPE Fall Technical Conference; 10 pages; Nov. 6, 2006.
Zhao et al., Lab on Paper, Lab Chip, 8(12), pp. 1988-1991, Dec. 2008.
Znidarsic-Plazl et al.; Steroid extraction in a microchannel system—mathematical modelling and experiments. Lab Chip, 7(7), pp. 883-889, Jul. 2007.
Zuker; Mfold Web Server for Nucleic Acid Folding and Hybridization Prediction; Nucleic Acid Research ; 31(13); pp. 3406-3415; Jul. 2003.
Zytkovicz et al.; Tandem mass spectrometric analysis for amino, organic, and fatty acid disorders in newborn dried blood spots; a

(56) References Cited

OTHER PUBLICATIONS two-year summary from the New England Newborn Screening Program, Clinical Chemistry, 47(11), pp. 1945-1955, Nov. 2001.
Fobel et al.; U.S. Appl. No. 15/457,930 entitled "Printed Digital Microfluidic Devices Methods of Use and Manufacture Thereof", filed Mar. 13, 2017.
Soto-Moreno et al.; U.S. Appl. No. 16/843,743 entitled "Multi-cartridge digital microfluidics apparatuses and methods of use," filed Apr. 8, 2020.
Jebrail et al.; U.S. Appl. No. 17/088,572 entitled "Control of evaporation in digital microfluidics," filed Nov. 3, 2020.
Cervantes et al.; U.S. Appl. No. 17/427,290 entitled "Nonfouling compositions and methods for manipulating and processing encapsulated droplets," filed Jul. 30, 2021.
Leriche et al.; Cleavable linkers in chemical biology; Bioorganic & Medicinal Chemistry; 20(2); pp. 571-582; Jan. 15, 2012.
Soto-Moreno et al.; U.S. Appl. No. 17/434,531 entitled "Digital microfluidics devices and methods of using them," filed Aug. 27, 2021.
Soto-Moreno et al.; U.S. Appl. No. 17/630,048 entitled "Digital microfluidics devices and methods of use thereof," filed Jan. 25, 2022.

* cited by examiner

EVAPORATION MANAGEMENT IN DIGITAL MICROFLUIDIC DEVICES

CROSS REFERENCE TO RELATED APPLICATIONS

This application is a continuation of U.S. patent application Ser. No. 15/579,239, filed on Dec. 4, 2017, titled "EVAPORATION MANAGEMENT IN DIGITAL MICROFLUIDIC DEVICES," which is a U.S. National Phase Application Under 35 U.S.C. § 371 of International Application No. PCT/US2016/036022 filed on Jun. 6, 2016, titled "EVAPORATION MANAGEMENT IN DIGITAL MECROFLUIDIC DEVICES," which claims priority to U.S. provisional patent application 62/171,772, filed on Jun. 5, 2015, titled "DEVICES AND METHODS FOR REACTION HYDRATION," each of which is incorporated herein by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

This application generally relates to digital microfluidic (DMF) apparatuses and methods. In particular, the apparatuses and methods described herein are directed to replenishing droplets when using DMF in air.

BACKGROUND

In recent years, efforts have been directed toward both automating and miniaturizing chemical and biochemical reactions. The lab-on-a-chip and biochip devices have drawn much interest in both scientific research applications as well as potentially point-of-care applications because they carry out highly repetitive reaction steps with a small reaction volume, saving both materials and time. While traditional biochip type devices utilize micro- or nano-sized channels and corresponding micropumps, microvalves, and microchannels coupled to the biochip to manipulate the reaction steps, these additional components increase cost and complexity of the microfluidic device.

Digital microfluidics (DMF) has emerged as a powerful preparative technique for a broad range of biological and chemical applications. DMF enables real-time, precise, and highly flexible control over multiple samples and reagents, including solids, liquids, and harsh chemicals, without need for pumps, valves, or complex arrays of tubing. In DMF, discrete droplets of nanoliter to microliter volumes are dispensed from reservoirs onto a planar surface coated with a hydrophobic insulator, where they are manipulated (transported, split, merged, mixed) by applying a series of electrical potentials to an embedded array of electrodes. Complex reaction series can be carried out using DMF alone, or using hybrid systems in which DMF is integrated with channel-based microfluidics. Hybrid systems offer tremendous versatility; in concept, each reaction step can be executed in the microfluidics format that best accommodates it.

For many applications it is most convenient to carry out DMF on an open surface, such that the matrix surrounding the droplets is ambient air. However, use of the air-matrix format necessitates accounting for droplet evaporation, especially when the droplets are subjected to high temperatures for long periods of time. In some instances, evaporation is considered a desirable feature, as it can facilitate concentration and isolation of solutes of interest. In biochemical contexts, however, evaporation frequently limits the utility of air-matrix DMF, because enzymatic reactions are often highly sensitive to changes in reactant concentration. Largely for this reason, investigators have attempted to use oil-matrix DMF for biochemical applications, despite numerous drawbacks including: 1) the added complexity of incorporating gaskets or fabricated structures to contain the oil; 2) unwanted liquid-liquid extraction of reactants into the surrounding oil; 3) incompatibility with oil-miscible liquids (e.g., organic solvents such as alcohols); and 4) efficient dissipation of heat, which undermines localized heating and often confounds temperature-sensitive reactions.

Another strategy is to place the air-matrix DMF device in a closed humidified chamber, but this often results in unwanted condensation on the DMF surface, difficult and/or limited access to the device, and need for additional laboratory space and infrastructure. These issues may be avoided by transferring reaction droplets from the air-matrix DMF device to microcapillaries, where they can be heated in dedicated off-chip modules without evaporation problems, however, this complicates design and manufacture of the air-matrix DMF device, introducing the added microcapillary interfaces and coordination with peripheral modules.

It would be highly advantageous to have an air-matrix DMF device that avoids the difficulties of evaporation even when droplets are heated or exposed to otherwise evaporative conditions, without requiring removal of the droplets from the matrix, while ensuring that proper concentrations and overall kinetics is maintained. Described herein are methods and apparatuses, including systems and devices, that may address the issues raised above.

SUMMARY OF THE DISCLOSURE

The present invention relates to air-matrix digital microfluidic (DMF) apparatuses and related methods that minimize evaporation even at increase evaporative conditions (e.g., elevated temperature, reduced humidity, etc.) by coordinating the application of additional fluid (e.g., rehydrating) to droplets, e.g., reaction droplets, being manipulated by an air-matrix DMF apparatus. For example, in an air-matrix DMF apparatus, reaction droplets may be replenished with medium, e.g., reaction reagents, at controlled temperature and volume to ensure that the reaction mixture retains the proper concentration and activity through the reaction process.

A typical DMF apparatus may include parallel plates separated by an air gap; one of the plates (typically the bottom plate) may contain a patterned array of individually controllable electrodes, and the opposite plate (e.g., the top plate) may include a continuous grounding electrode. Alternatively, grounding electrode(s) can be provided on the same plate as the actuating/high-voltage electrodes. The surfaces of the plates in the air gap may include a dielectric insulator with a hydrophobic material to decrease the wettability of the surface and to add capacitance between the droplet and the control electrode. The droplets may be manipulated in the air gap space between the plates, and may include or have access to a starting material or materials and any reaction reagents. The air gap may be divided up into regions, as some regions of the plates may include heating/ cooling (e.g., by Peltier device, resistive heating, convective heating/cooling, etc. in thermal contact with the region) localized to that region. Detection (including imaging or other sensor-based detection) may also be provided over one or more localized regions; in some variations imaging may be provided over all or the majority of the reaction region (air gap space).

Thus, any of the DMF apparatuses described herein may include one or a series of thermal zones or regions that are in thermal communication that region, including in contact with the plates and/or with the actuation electrodes and therefore the plates.

The actuation electrodes are able to move droplets within the air gap. The actuation electrodes may divide the working region within the air-gap into discrete regions, such that each electrode corresponds to a unit region. In the examples provided herein, these unit regions are shown as relatively uniform in size and shape (e.g., square) corresponding to the electrode shapes and sizes; it should be understood that they may be any appropriate shape and/or size (e.g., including non-square shapes, such as round, oval, rectangular, triangular, hexagonal, etc., including irregular shapes, and also including any combination of shapes and/or sizes). The unit regions, each corresponding to a single electrode, may be grouped together functionally (thermally, electrically, etc.) and/or structurally to form regions including cooling/heating regions (thermal zones), imaging regions, etc. Thermal zones may be heated or cooled to temperatures necessary for performing a desired reaction. Thermoelectric components (e.g., Peltier devices, resistive heaters, convective heaters, etc.) and/or temperature detectors (e.g., resistive temperature detectors, RTDs, etc.) may be used to provide heating or cooling and detection of the temperature on the DMF device. The apparatus may also include insulated (thermally insulated) separation regions between different regions, including thermal voids that insulate one thermal zone from another.

The method and apparatuses described herein may generally increase the reaction hydration in droplets on a DMF device, thus obviating the need for a humidified chamber or for a material (e.g., oil) or special chamber to prevent or limit evaporation. Instead, evaporation of the reaction fluid (e.g., solvent, water, media, etc.) is permitted, and instead addition of treated (e.g., heated) reaction fluid is automatically added to droplets when an appropriate trigger threshold is reached. The methods and apparatuses described herein may allow execution of biochemical reactions using air-matrix DMF over a range of temperatures (for example, but not limited to, 4-95° C.) and incubation times (for example, but not limited to, at least one hour). In one embodiment, the invention provides timely replenishment of p reaction volume using pre-heated droplets of solvent. Through this approach, the reaction volume and temperature may be maintained relatively constant (≤20% and ≤1° C. change, respectively) over the course of the biochemical reaction. This may therefore enable the use of an air-matrix DMF device in executing multiple biochemical reactions, and in particular, the use of air-matrix DMF for performing amplification and detection of polynucleotides (e.g., RNA fragmentation, first-strand cDNA synthesis, and PCR), including those drawn from a gene expression analysis workflow. Surprisingly, the inventors have found that the resulting reaction products are essentially indistinguishable from those generated by conventional bench-scale methods.

The DMF apparatuses described herein may include a mechanism for replenishing the reaction reagents throughout the reaction process. In some variations, the DMF devices may include a through-hole connected to a port and corresponding tubing for delivering replenishing reagents or other solutions needed for the reaction being performed. In some variations there may be more than one port or a multiple tubing connector for replenishing different reagents at different steps in the reaction process.

In some examples, the evaporation of the reaction may be monitored. Detection may be visual or may be through automated means. Automated means include optical detection (e.g. camera), colorimetric, detecting changes to electrical properties, and so forth.

For example, described herein are methods of replenishing solvent in a reaction droplet on air-matrix digital microfluidic (DMF) apparatus to correct or adjust for evaporation of the reaction droplet. For example, a method of replenishing a reaction droplet on an air-matrix digital microfluidic (DMF) apparatus to correct for evaporation may include: monitoring a reaction droplet in an air gap region of the air-matrix DMF apparatus to determine when the volume of the reaction droplet falls below a threshold, wherein the reaction droplet comprises a solvent and reaction reagents; introducing a replenishing droplet into the air gap region of the air-matrix DMF, wherein the replenishing droplet consists of solvent; adjusting the replenishing droplet temperature to the reaction droplet temperature; and combining the replenishing droplet with the reaction droplet when the temperature of the replenishing droplet matches the temperature of the reaction droplet, after the volume of the reaction droplet falls beneath the threshold.

In general, an air-matrix DMF apparatus may refer to any non-liquid interface of the DMF apparatus in which the liquid droplet being manipulated by the DMF apparatus is surrounded by an air (or any other gas) matrix. An air-matrix may also and interchangeably be referred to as a "gas-matrix" DMF apparatus, as the gas does not have to be air, though commonly may be. As used herein, the term solvent may refer generically to any liquid into which a solute is dissolved, suspended or immersed to form the droplet. In some variations the solvent may be water. In general, the solvent is the liquid portion of the droplet that is lost by evaporation.

A method of replenishing a reaction droplet during a reaction on an air-matrix digital microfluidic (DMF) apparatus to correct for evaporation in the reaction droplet may include: monitoring a reaction droplet in an air gap region of the air-matrix DMF apparatus to determine when the volume of the reaction droplet falls below a threshold, wherein the reaction droplet comprises a solvent and reaction reagents; introducing a replenishing droplet into the air gap region of the air-matrix DMF, wherein the replenishing droplet consists of solvent; adjusting the replenishing droplet temperature to the reaction droplet temperature; and combining the replenishing droplet with the reaction droplet when the temperature of the replenishing droplet matches the temperature of the reaction droplet, after the volume of the reaction droplet falls beneath the threshold, by applying energy to electrodes of the DMF apparatus to move either or both the reaction droplet and the replenishing droplet to combine the two. Applying energy to the actuating electrodes moves a droplet adjacent to the actuation electrode (e.g., beneath it or above it) by electrowetting and/or electrostatic and/or other electrical forces between dipoles in the dielectric layer of the DMF apparatus and polar molecules in the droplet.

For example, a method of replenishing a reaction droplet during a reaction on an air-matrix digital microfluidic (DMF) apparatus to correct for evaporation may include:

monitoring a reaction droplet in an air gap region of the air-matrix DMF apparatus to determine when the volume of the reaction droplet falls below 30% of an initial volume, wherein the reaction droplet comprises a solvent and reaction reagents; introducing a replenishing droplet into the air gap region of the air-matrix DMF through an aperture in one or two plates forming the air gap region, wherein the replenishing droplet consists of solvent; moving the replenishing droplet to a region adjacent to the reaction droplet; adjusting the replenishing droplet temperature to the reaction droplet temperature; and combining the replenishing droplet with the reaction droplet when the temperature of the replenishing droplet matches the temperature of the reaction droplet, after the volume of the reaction droplet falls beneath the threshold.

In any of these methods, combining may comprise moving the replenishing droplet to the reaction droplet by applying energy to electrodes of the DMF (e.g., adjacent, such as over or beneath the droplet) to move the droplet. As will be described in detail herein, a DMF apparatus may automatically monitor the reaction droplet to determine when the volume has dropped below a predetermined level (e.g., 10%, 15%, 20%, 30%, 35%, 40%, 50%, etc. of the initial volume), and to prepare and combine it with a replenishing droplet that has been heated and otherwise prepared for combining with the reaction droplet.

In general, the inventors have found that it is important that the replenishing droplet be added in the manner described herein in order to avoid disrupting the ongoing reaction being performed in the reaction droplet by DMF; for example, adding a replenishing droplet that is not at the correct temperature (e.g., matching the temperature of the reaction droplet into which it is being added) may disrupt the reaction. Adding the replenishing droplet too soon (e.g., before a substantial amount of evaporation has occurred) or too late (after a substantial amount of evaporation has occurred) may disrupt the reaction. For example, the DMF apparatuses described herein may automatically determine when the reaction droplet has lost between 10% and 55% of the volume (e.g., between a lower value of 10%, 12%, 15%, 17%, 20%, 22%, 25%, etc. and an upper value of 15%, 17%, 20%, 22%, 25%, 27%, 30%, 33%, 35%, 37%, 40%, 45%, 50%, 55%, etc., where the upper value is larger than the lower value, such as between 15% and 35%, etc.). In addition, the volume of the replenishing droplet may be scaled or adjusted so as not to disrupt the reaction. For example, the volume of the replenishing droplet may be approximately equal (within 5%, 10%, 15%, 20%, 25%, 30%) to the volume of solvent lost by the reaction droplet.

In general, an air-matrix DMF apparatus may perform any of these methods multiple times (e.g., replenishing a single reaction droplet) in an ongoing manner as evaporation occurs, and/or for multiple droplets (e.g., simultaneously monitoring multiple droplets). These methods may be particularly helpful where the reaction droplets are being warmed or heated.

In any of the methods described herein, monitoring may include determining a change in size of the reaction droplet as evaporation occur. For example, monitoring may include imaging the reaction droplet and determining a change in the size of the reaction droplet (e.g., the size within the air gap and/or the number of unit cells holding the droplet, etc.). Thus, monitoring the reaction droplet may include optically monitoring the reaction droplet. Alternatively or additionally, monitoring may include detecting a chance in an electrical property due to the reduction in volume of the reaction droplet, e.g., with evaporation. For example, monitoring may include detecting a capacitance change in an electrode adjacent to the reaction droplet (including the one or more unit cells that the reaction droplet is above). Monitoring may comprise determining a change in size of the reaction drop based on a change in the reaction droplet's position relative to two or more actuation electrodes of the air-matrix DMF apparatus.

As mentioned above, a reduction in the size and/or volume of the reaction droplet, e.g., due to evaporation, beyond a threshold value (e.g., 10%, 12%, 15%, 17%, 20%, 22%, 25%, 27%, 30%, 33%, 35%, 37%, 40%, 50% etc.) may trigger, including automatically triggering a controller, to deliver a pretreated (e.g., temperature matched) replenishing droplet of an appropriate volume and combine it with the reaction droplet. Thus, in some variations the threshold level for triggering reagent replenishment is a loss of reaction droplet volume of 30% or more.

As mentioned, the methods described herein may be particularly helpful where the reaction droplet is being warmed or heated, as a substantial amount of evaporation may occur over a quick (4-10 min) time frame. Thus any of the methods described herein may include a step of heating the reaction droplet in a thermal zone of the air gap region of the air-matrix DMF apparatus.

In general, the step of introducing the replenishing droplet to the reaction droplet may include moving either or both the reaction and replenishing droplet by DMF. The replenishing droplet may original from a reservoir of replenishing fluid (e.g., solvent). In particular, it may be beneficial to have the replenishing fluid delivered through the first or second (e.g., upper or lower) plates into the air gap region, including introducing the replenishing droplet from an aperture through one of two plates of the air-matrix DMF apparatus forming the air gap region. As described in greater detail below, the aperture be formed through one or more of the actuation electrodes.

The volume of the replenishing droplet may configured to prevent over-dilution of the reaction droplet, which may interfere with whatever reaction is being carried out by the reaction droplet. For example, the volume of the replenishing droplet may be between about 10% and about 55% the volume of the reaction droplet (e.g., between about 10% and about 50%, between about 15% and about 40%, between about 20% and about 40%, etc.).

The replenishing droplet temperature may be adjusted as necessary. For example, the temperature of the replenishing droplet may be adjusted by moving the replenishing droplet to the same thermal zone regulating the temperature of the reaction droplet or to a second thermal zone that is temperature matched to the reaction droplet and/or the thermal zone regulating the temperature of the reaction droplet. For example adjusting the temperature of the replenishing droplet may include holding the replenishing droplet at a region that is adjacent to the reaction droplet and in thermal communication with region beneath the reaction droplet. Similarly, adjusting the replenishing droplet temperature may comprise holding the replenishing droplet at a thermal zone and adjusting the temperature of the thermal zone to match the temperature of the reaction droplet.

In any of the methods described herein, the droplets (reaction droplets) may be moved and/or driven to combine by adjusting the electrowetting of surfaces adjacent to the replenishing droplet and/or the reaction droplet to drive the droplets together.

Also described herein are air-matrix digital microfluidic (DMF) apparatuses configured to replenishing solvent in a reaction droplet to correct for evaporation. Any of these apparatuses may include: a first plate having a first hydrophobic layer; a second plate having a second hydrophobic layer; an air gap formed between the first and second hydrophobic layers; a plurality of actuation electrodes adjacent to the first hydrophobic layer, wherein each actuation electrode defines a unit cell within the air gap; one or more ground electrodes adjacent to the second hydrophobic layer across the air gap from the plurality first hydrophobic layer; a thermal regulator adjacent to the first plate, wherein the thermal regulator forms a thermal zone comprising a plurality of adjacent unit cells, wherein the thermal regulator is configured to heat and/or cool the reaction droplet within the thermal zone; a sensor configured to detect a change in the volume of a reaction droplet within the air gap; and a controller in communication with the sensor and configured to detect the change in the volume of the reaction droplet below a threshold value and to: introduce a replenishing droplet into the air gap, adjust a temperature of the replenishing droplet to match a temperature of the reaction droplet; and combine the replenishing droplet with the reaction droplet when the replenishing droplet temperature matches the reaction droplet temperature.

An air-matrix digital microfluidic (DMF) apparatus configured to replenishing solvent in a reaction droplet to correct for evaporation may include: a first plate having a first hydrophobic layer; a second plate parallel to the first plate and having a second hydrophobic layer; an air gap formed between the first and second hydrophobic layers; a plurality of actuation electrodes adjacent to the first hydrophobic layer, wherein each actuation electrode defines a unit cell within the air gap; one or more ground electrodes adjacent to the second hydrophobic layer across the air gap from the plurality first hydrophobic layer; a thermal regulator adjacent to the first plate, wherein the thermal regulator forms a thermal zone comprising a plurality of adjacent unit cells, wherein the thermal regulator is configured to heat and/or cool the reaction droplet within the thermal zone; a sensor configured to detect a change in the volume of a reaction droplet within the thermal zone; an aperture extending into the air gap through the first plate, wherein the aperture extends through an actuation electrode and is configured to connect to a source of solvent; and a controller in communication with the sensor and configured to detect the change in the volume of the reaction droplet below a threshold value and to: introduce a replenishing droplet into the air gap out of the aperture, adjust a temperature of the replenishing droplet to match a temperature of the reaction droplet; and combine the replenishing droplet with the reaction droplet when the replenishing droplet temperature matches the reaction droplet temperature.

Any of the apparatuses and methods of using them described herein may include an aperture through which the replenishing fluid (e.g., solvent, such as water) may delivered into the air gap. The aperture may pass through an actuation electrode; this may allow the controller to control dispensing of the droplet out and/or away from the aperture. For example, the aperture may pass through the first plate within a unit cell, and may generally be configured to connect to (or may be connected to) a source of solvent to form a replenishing droplet within the air gap. Thus, any of the apparatuses may include an aperture extending into the air gap through the first plate, wherein the aperture extends through an actuation electrode and is configured to connect to a source of solvent to form a replenishing droplet within the air gap. In some variations the aperture is passes through the second plate, and may extend through a ground electrode. In some variations the aperture does not pass through the electrode (either ground or actuation electrode), but is adjacent to the electrode or partially surrounded by the electrode.

The aperture may be connected to the source of replenishing fluid by a tubing adapter configured to couple to the aperture to form the replenishing droplet. A valve may be used and controlled, e.g., by the controller, to regulate dispensing of the replenishing droplet.

Any of the apparatuses and methods of using them described herein may include a resistive temperature detector in thermal communication with the thermal zone. The temperature detector may be a thermistor, or the like. In general, the temperature detector may be used to provide control feedback for regulating the temperature of thermal zone (and/or of individual unit cells or groups of cells).

Any of the apparatuses and methods of using them described herein may include one or a series of reagent reservoirs configured to hold reaction components. These reservoirs may be used to provide droplets of additional reaction components (e.g., enzymes, primers, etc.) that may be combined with the reaction droplet(s) within the air air-matrix DMF apparatus.

Thermal regulation of the thermal zone(s) of the air-matrix DMF apparatus may be enhanced by using one or more thermal void regions between and/or at least partially around the thermal zones of the air-matrix DMF. A thermal void region may include a cut-out or open region (gap). For example, any of these apparatuses may include at least one thermal void adjacent to the thermal zone and configured to prevent or reduce the transfer of thermal energy between the thermal zone and unit cells outside of the thermal zone. For example, an air-matrix DMF may include a tubing adapter configured to couple to the aperture to form the replenishing droplet.

Any appropriate thermal regulator (e.g., heater and/or cooler) may be used. For example, the thermal regulator may be a thermoelectric heater, such as a Peltier device, Peltier heat pump, solid state refrigerator, or thermoelectric cooler (TEC). The thermal regulator may be integrated with a temperature sensor, or the temperature sensor may be separate. For example, the temperature sensor may be a resistive temperature detector (RTD).

As mentioned above, the air-matrix DMF apparatuses described herein may generally be configured to detect change in volume (e.g., size) of a droplet. Thus, any of these apparatuses may include one or more sensors for detecting changes in droplet volume based on imaging (e.g., visual sensors), electrical properties (e.g., changes in capacitance and/or resistance detected through the electrodes including the actuation electrode(s) or separate electrodes), etc. For example, an apparatus may include a sensor configured to detect the change in the volume of the reaction droplet, wherein the sensor comprises an optical sensor. The apparatus may be configured to detect changes in size of a droplet anywhere in the apparatus (e.g., the sensor(s) may be over the entire air-gap region) or one or more sub-regions of the apparatus, in particular the thermal zone(s). For example, the apparatus may include an electrical sensor configured to detect the change in the volume of the reaction droplet by detecting an electrical property between one or more actuation electrodes and the one or more ground electrodes. A sensor to detect the change in electrical properties may be integrated into the controller or it may be one or more separate, dedicated sensors. When the sensor is configured to use the actuation electrodes, it may include circuitry, logic and/or both to determine the resistivity and/or capacitance change between one or more actuation electrode and ground;

changes in the electrical properties over time may indicate changes in volume of the droplet. In some variations the droplet may span multiple unit cells, and the electrical load, resistance and/or capacitance between the actuation electrode and ground for each cell may clearly indicate when a droplet has shrunken down so that it is contained within a fewer unit cells. In other variation, a reduction in droplet size may result in a change in an electrical property that may be compared/correlated to a relative (e.g., compared to an initial time value) and/or an absolute value (based on the electrical properties of the composition of the reaction droplet) to determine when the size of the droplet has reduced beyond a threshold value. The threshold value may also be based on a relative value (e.g., percentage of the original droplet size) or an absolute value (e.g., reduced from 2 μL to 1.4 μL, etc.). In general, these apparatuses may include a controller that is configured to detect a change in the volume of the reaction droplet based on input from the sensor. As mentioned above, the controller may be configured to control a valve in fluid communication with a source of replenishing fluid and/or may drive dispensing of a replenishing droplet using DMF (e.g., by applying energy to actuation electrode(s) to adjust the electrowetting and release/move a replenishing droplet of the appropriate size out of the reservoir of replenishing fluid. In some variations, the controller may be configured to combine the replenishing droplet with the reaction droplet by applying energy to actuation electrodes of the DMF to drive movement of the replenishing droplet and/or the reaction droplet.

Although the majority of the devices described herein are air-matrix DMF apparatuses that include two parallel plates forming the air gap, any of the techniques (methods and apparatuses) may be adapted for operation as part of a one-plate air-matrix DMF apparatus. In this case, the apparatus includes a single plate and may be open to the air above the single (e.g., first) plate; the "air gap" may correspond to the region above the plate in which one or more droplet may travel while on the single plate. The ground electrode(s) may be positioned adjacent to (e.g., next to) each actuation electrode, e.g., below the single plate. The plate may be coated with the hydrophobic layer (and an additional dielectric layer maybe positioned between the hydrophobic layer and the electrode). The methods and apparatuses for correcting for evaporation may be particularly well suited for such single-plate air-matrix DMF apparatuses.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 3A shows the size distribution profile for total RNA before fragmentation, and FIGS. 3B and 3C compare post-fragmentation profiles generated using the air-matrix DMF methods (with controlled rehydration) described herein, in FIG. 3*b*, compared to conventional (tube) methods, in FIG. 3*c*. Fragment size measurements were made using an RNA Nano 6000 Chip on a 2100 Bioanalyzer (Agilent, Santa Clara Calif.).

DETAILED DESCRIPTION

Figures 1A, 1B, 1C:
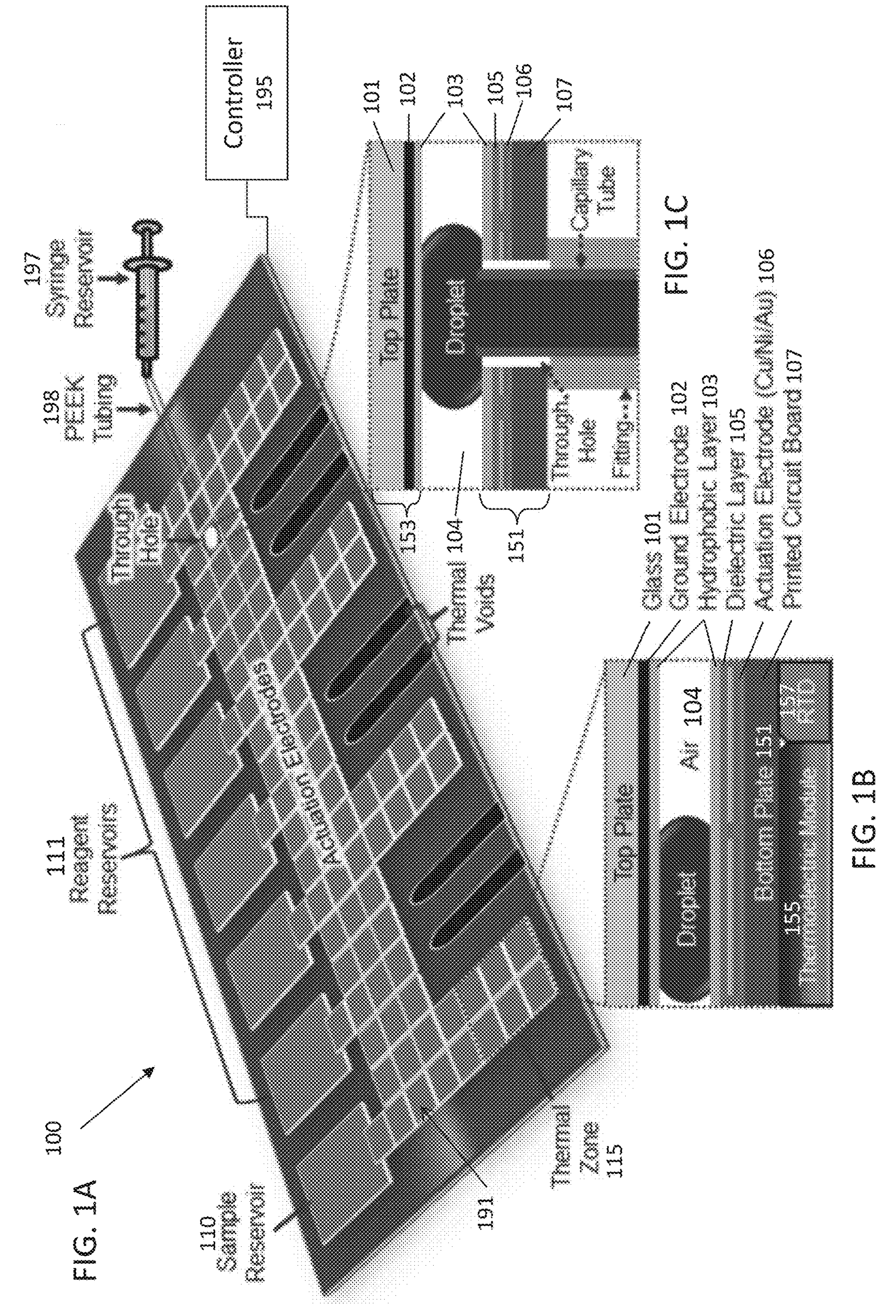
FIG. 1A is a schematic of one example of an air-matrix digital microfluidic (DMF) apparatus, from a top perspective view.
FIG. 1B shows an enlarged view through a section through a portion of the air-matrix DMF apparatus shown in FIG. 1A, taken through a thermally regulated region (thermal zone).
FIG. 1C shows an enlarged view through a second section of a region of the air-matrix DMF apparatus of FIG. 1A; this region includes an aperture through the bottom plate and an actuation electrode, and is configured so that a replenishing droplet may be delivered into the air gap of the air-matrix DMF apparatus from the aperture (which connects to the reservoir of solvent, in this example shown as an attached syringe).

Described herein are air-matrix Digital Mircrofluidics (DMF) systems that may be used for multiplexed processing and routing of samples and reagents to and from channel-based microfluidic modules that are specialized to carry out all other needed functions. The air-matrix DMF integrates channel-based microfluidic modules with mismatched input/output requirements, obviating the need for complex networks of tubing and microvalves. These apparatuses (including systems and devices) may operate at temperatures and for durations that would otherwise result in substantial amount of evaporation, because they are performed in an air gap without requiring oil or humidification which would otherwise increase the expense and complexity; these devices and methods do not require (and may be performed explicitly without) a humidifying chamber and/or oil encapsulation of the reaction droplet in the DMF device. Surprisingly, preliminary results from the methods described herein show a higher yield and purity, particularly in performing amplification and/or hybridization of polynucleotides.

As used herein, the term, "thermal regulator" (or in some instances, thermoelectric module or TE regulator) may refer to thermoelectric coolers or Peltier coolers and are semiconductor based electronic component that functions as a small heat pump. By applying a low voltage DC power to a TE regulator, heat will be moved through the structure from one side to the other. One face of the thermal regulator may thereby be cooled while the opposite face is simultaneously heated. A thermal regulator may be used for both heating and cooling, making it highly suitable for precise temperature control applications. Other thermal regulators that may be used include resistive heating and/or recirculating heating/cooling (in which water, air or other fluid thermal medium is recirculated through a channel having a thermal exchange region in thermal communication with all or a region of the air gap, e.g., through a plate forming the air gap).

As used herein, the term "temperature sensor" may include a resistive temperature detectors (RTD) and includes any sensor that may be used to measure temperature. An RTD may measure temperature by correlating the resistance of the RTD element with temperature. Most RTD elements consist of a length of fine coiled wire wrapped around a ceramic or glass core. The RTD element may be made from a pure material, typically platinum, nickel or copper or an alloy for which the thermal properties have been characterized. The material has a predictable change in resistance as the temperature changes and it is this predictable change that is used to determine temperature.

As used herein, the term "digital microfluidics" may refer to a "lab on a chip" system based on micromanipulation of discrete droplets. Digital microfluidic processing is performed on discrete packets of fluids (reagents, reaction components) which may be transported, stored, mixed, reacted, heated, and/or analyzed on the apparatus. Digital microfluidics may employ a higher degree of automation and typically uses less physical components such as pumps, tubing, valves, etc.

As used herein, the term "cycle threshold" may refer to the number of cycles in a polymerase chain reaction (PCR) assay required for a fluorescence signal to cross over a threshold level (i.e. exceeds background signal) such that it may be detected.

The air-matrix DMF apparatuses described herein may be constructed from layers of material, which may include printed circuit boards (PCBs), plastics, glass, etc. Multilayer PCBs may be advantageous over conventional single-layer devices (e.g., chrome or ITO on glass) in that electrical connections can occupy a separate layer from the actuation electrodes, affording more real estate for droplet actuation and simplifying on-chip integration of electronic components.

A DMF apparatus may be any dimension or shape that is suitable for the particular reaction steps of interest. Furthermore, the layout and the particular components of the DMF device may also vary depending on the reaction of interest. While the DMF apparatuses described herein may primarily describe sample and reagent reservoirs situated on one plane (that may be the same as the plane of the air gap in which the droplets move), it is conceivable that the sample and/or reagent reservoirs may be on different layers relative to each other and/or the air gap, and that they may be in fluid communication with one another.

FIG. 1A shows an example of the layout of an air-matrix DMF apparatus 100. In general, the air-matrix DMF apparatus includes a plurality of unit cells 191 that are adjacent to each other and defined by having a single actuation electrode 106 opposite from a ground electrode 102; each unit cell may any appropriate shape, but may generally have the same approximate surface area. In FIG. 1A, the unit cells are rectangular. The droplets (e.g., reaction droplets) fit within the air gap between the first 153 and second 151 plates (shown in FIGS. 1A-1C as top and bottom plates). The overall air-matrix DMF apparatus may have any appropriate shape, and thickness. FIG. 1B is an enlarged view of a section through a thermal zone of the air-matrix DMF shown in FIG. 1A, showing layers of the DMF device (e.g., layers forming the bottom plate). In general, the DMF device (e.g., bottom plate) includes several layers, which may include layers formed on printed circuit board (PCB) material; these layers may include protective covering layers, insulating layers, and/or support layers (e.g., glass layer, ground electrode layer, hydrophobic layer; hydrophobic layer, dielectric layer, actuation electrode layer, PCB, thermal control layer, etc.). The air-matrix DMF apparatuses described herein also include both sample and reagent reservoirs, as well as a mechanism for replenishing reagents.

In the example shown in FIGS. 1A-1C, a top plate 101, in this case a glass or other top plate material provides support and protects the layers beneath from outside particulates as well as providing some amount of insulation for the reaction occurring within the DMF device. The top plate may therefore confine/sandwich a droplet between the plates, which may strengthen the electrical field when compared to an open air-matrix DMF apparatus (without a plate). The upper plate (first plate in this example) may include the ground electrode and may be transparent or translucent; for example, the substrate of the first plate may be formed of glass and/or clear plastic. Adjacent to and beneath the substrate (e.g., glass) is a ground electrode for the DMF circuitry (ground electrode layer 102). In some instances, the ground electrode is a continuous coating; alternatively multiple, e.g., adjacent, ground electrodes may be used. Beneath the grounding electrode layer is a hydrophobic layer 103. The hydrophobic layer 103 acts to reduce the wetting of the surfaces and aids with maintaining the reaction droplet in one cohesive unit.

The second plate, shown as a lower or bottom plate 151 in FIGS. 1A-1C, may include the actuation electrodes defining the unit cells. In this example, as with the first plate, the outermost layer facing the air gap 104 between the plates also includes a hydrophobic layer 103. The material forming the hydrophobic layer may be the same on both plates, or it may be a different hydrophobic material. The air gap 104 provides the space in which the reaction droplet is initially contained within a sample reservoir and moved for running the reaction step or steps as well as for maintaining various reagents for the various reaction steps. Adjacent to the hydrophobic layer 103 on the second plate is a dielectric layer 105 that may increase the capacitance between droplets and electrodes. Adjacent to and beneath the dielectric layer 105 is a PCB layer containing actuation electrodes (actuation electrodes layer 106). As mentioned, the actuation electrodes may form each unit cell. The actuation electrodes may be energized to move the droplets within the DMF device to different regions so that various reaction steps may be carried out under different conditions (e.g., temperature, combining with different reagents, etc.). A support substrate 107 (e.g., PCB) may be adjacent to and beneath (in FIGS. 1B and 1C) the actuation electrode layer 106 to provide support and electrical connection for these components, including the actuation electrodes, traces connecting them (which may be insulated), and/or additional control elements, including the thermal regulator 155 (shown as a TEC), temperature sensors, optical sensor(s), etc. One or more controllers 195 for controlling operation of the actuation electrodes and/or controlling the application of replenishing droplets to reaction droplets may be connected but separate from the first 153 and second plates 151, or it may be formed on and/or supported by the second plate. In FIGS. 1A-1C the first plate is shown as a top plate and the second plate is a bottom plate; this orientation may be reversed. A source or reservoir 197 of solvent (replenishing fluid) is also shown connected to an aperture in the second plate by tubing 198.

As mentioned, the air gap 104 provides the space where the reaction steps may occur, providing areas where reagents may be held and may be treated, e.g., by mixing, heating/cooling, combining with reagents (enzymes, labels, etc.). In FIG. 1A the air gap 104 includes a sample reservoir 110 and a series of reagent reservoirs 111. The sample reservoir may further may include a sample loading feature for introducing the initial reaction droplet into the DMF device. Sample loading may be loaded from above, from below, or from the side and may be unique based on the needs of the reaction being performed. The sample DMF device shown in FIG. 1A includes six sample reagent reservoirs where each includes an opening or port for introducing each reagent into the respective reservoirs. The number of reagent reservoirs may be variable depending on the reaction being performed. The sample reservoir 110 and the reagent reservoirs 111 are in fluid communication through a reaction zone 112. The reaction zone 112 is in electrical communication with actuation electrode layer 106 where the actuation electrode layer 106 site beneath the reaction zone 112.

The actuation electrodes 106 are depicted in FIG. 1A as a grid or unit cells. In other examples, the actuation electrodes may be in an entirely different pattern or arrangement based on the needs of the reaction. The actuation electrodes are configured to move droplets from one region to another region or regions of the DMF device. The motion and to some degree the shape of the droplets may be controlled by switching the voltage of the actuation electrodes. One or more droplets may be moved along the path of actuation electrodes by sequentially energizing and de-energizing the electrodes in a controlled manner. In the example of the DMF apparatus shown, a hundred actuation electrodes (forming approximately a hundred unit cells) are connected with the seven reservoirs (one sample and six reagent reservoirs). Actuation electrodes may be fabricated from any appropriate conductive material, such as copper, nickel, gold, or a combination thereof.

Figure 7:
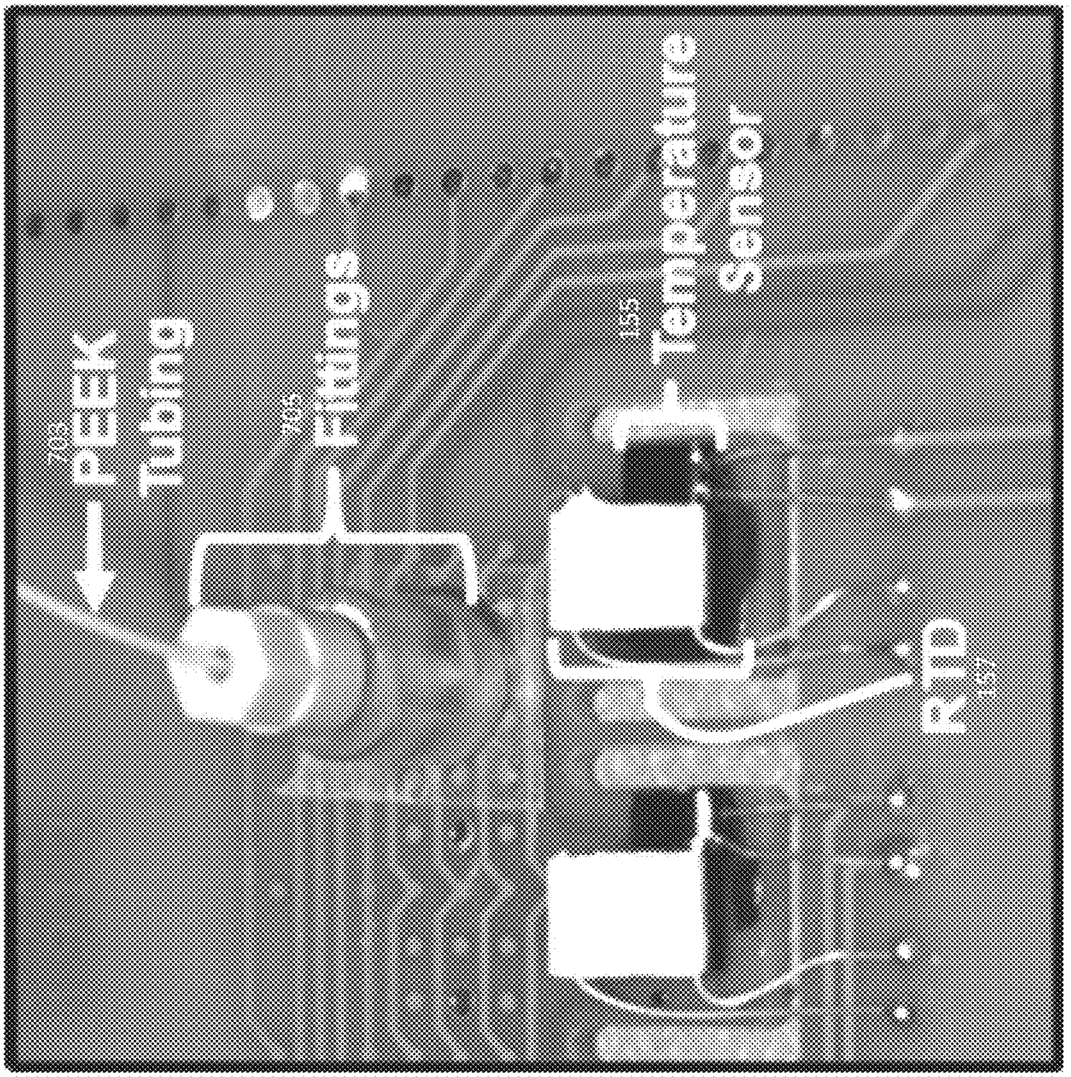
FIG. 7 shows a bottom view of an example of a portion of an air-matrix DMF apparatus as described herein, showing the integrated thermoelectric (TEC) cooler/heaters, temperature sensors (resistive temperature detectors, RTDs) and a micro-capillary interface for introduction of replenishing droplets into the air gap region via a through hole.

All or some of the unit cells formed by the actuation electrodes may be in thermal communication with at least one thermal regulator (e.g., TEC 155) and at least one temperature detector/sensor (RTD 157). In the examples shown, the actuation electrodes are integrated with four thermal zones, each including a thermoelectric heater/cooler 155 and a resistive temperature detectors (RTD) 157; fewer or more thermal zones may be used. FIG. 7 shows an example of the bottom surface of an air-matrix DMF apparatus with thermal regulators and temperature sensors attached to the second (bottom) plate. Each thermal regulator and temperature sensor is affixed to the bottom plate. FIG. 7 also shows thermal conduit channeling heat through the bottom DMF plate to a set of six actuation electrodes that form a thermal zone in the air gap above these six actuation electrodes for each thermal zone. Each of the device's four thermal zones 115 can be controlled independently of the others, such that four different on-chip temperatures can be maintained simultaneously. Each of these zones may be thermally isolated from the remainder of the device by thermal voids 114 (shown in FIG. 1A) formed in the substrate of the second plate. The thermal voids 114 may provide thermal insulation and separation between different thermal zones 115. Rapid change in droplet temperature may be achieved through transport across the air gap from one thermal zone to another and/or by controlling the temperature of a single thermal zone. In general the temperature of the thermal zone may be precisely controlled. For example, the temperature difference measured by the RTD on the back side of the second plate and a droplet within its corresponding thermal zone was measured using a fine-gauge thermocouple inserted into the droplet, and found to be 3° C. (±0.5° C.). The difference is mainly a function of the temperature drop across the PCB substrate, rather than of ambient temperature. To account for this temperature difference, a compensation factor may be incorporated into programming of thermal zone temperature settings, to ensure that zone-localized droplets reached the desired temperature.

Figure 6:
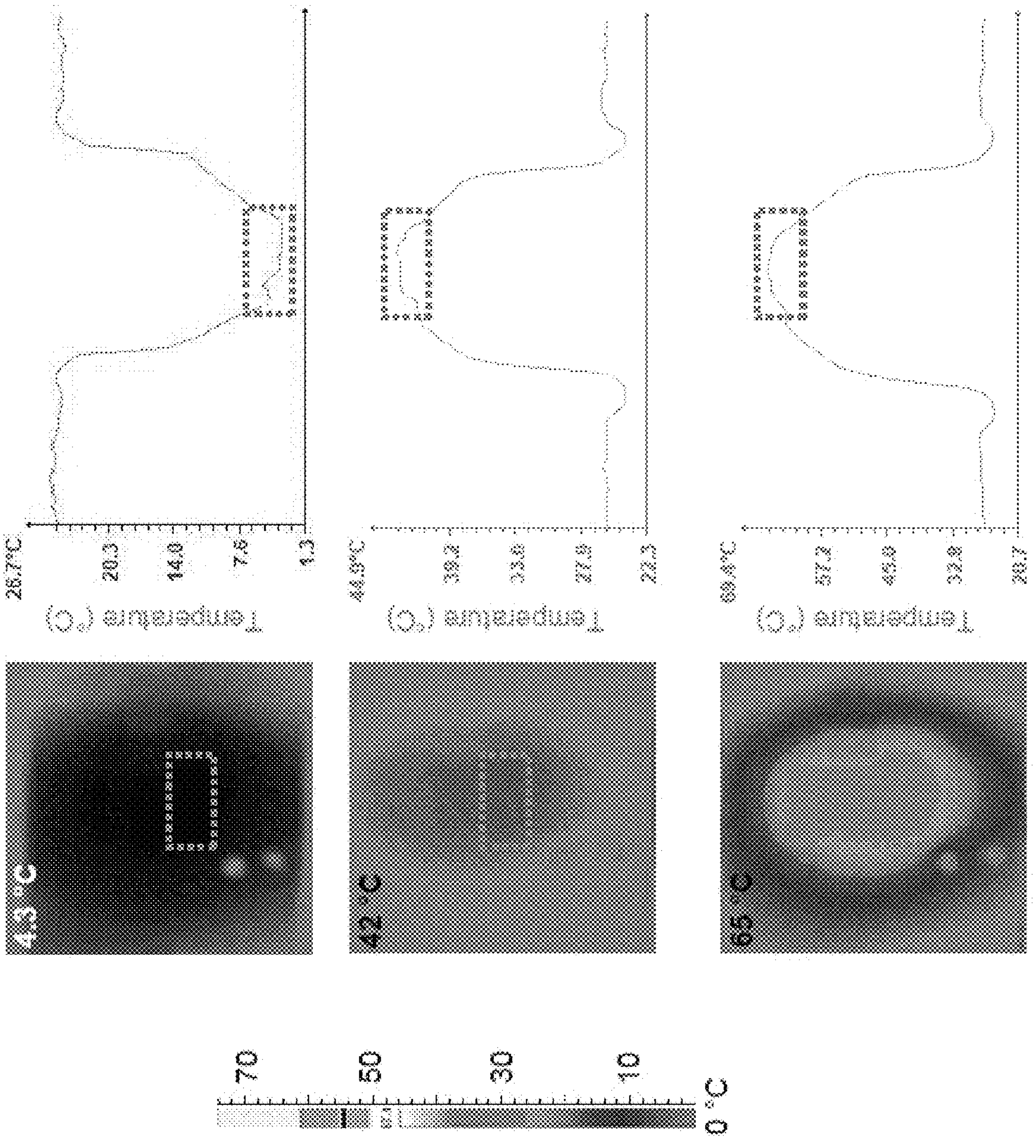
FIG. 6 illustrates the temperature profiles of a thermally controlled region by thermal imaging for three different temperatures.
Figure 8:
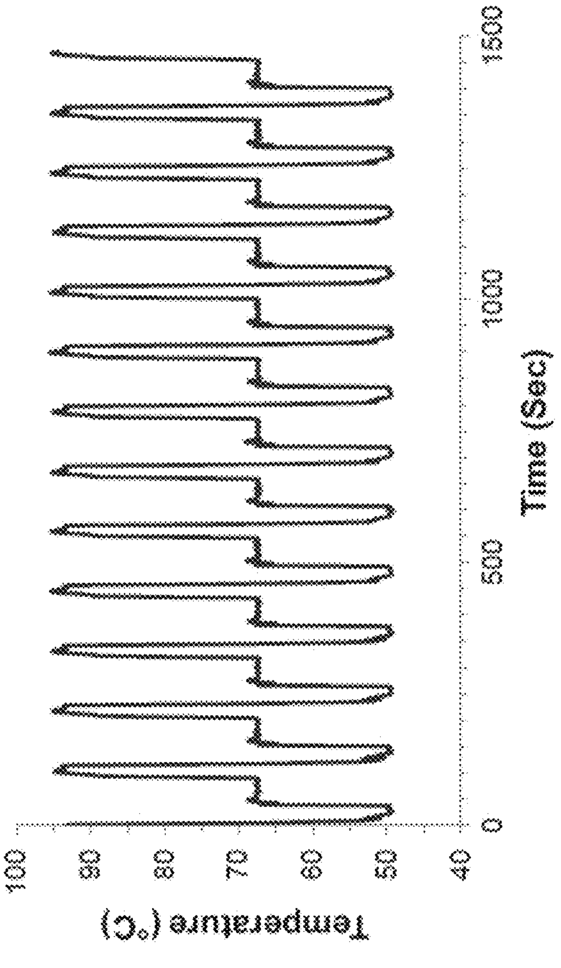
FIG. 8 illustrates an example of a temperature cycling trace of a thermal zone over time.

Another example of the operation of a thermal zone (e.g., thermal regulator and temperature sensor) is shown in FIG. 6. FIG. 6 illustrates profiles of surface temperatures in and around a thermal zone at three different temperatures, 4.3° C. (top), 42° C. (middle), and 65° C. (bottom). The heat maps shown in grayscale on the left indicate the temperature distribution across a thermal zone for each of these three different temperatures. As can be seen from the corresponding temperature profiles on the right (taken through the middle region of the thermal image), for all three temperatures, the temperature is closest to the desired temperature in the center of the thermal zone. FIG. 8 shows a trace of the temperature cycling over time. As shown, the air-matrix DMF apparatus is able to hold the temperature reasonably constant over the (boxed) thermal zone, and falls off rapidly outside of the thermal zone.

In contrast to the apparatuses described herein (which is an air-matrix DMF), prior art DMF apparatuses typically use an oil immersion DMF technique to combat the problem of evaporation, particularly when heating. In some instances, the droplets are encased in oil or a water/oil shell. While immersing the reaction droplet in oil aids with evaporation of the droplet during heating, addition steps and mechanisms must later be implemented to remove the oil from the droplet. Those using oil immersion must also ensure that oil does not interfere with subsequent steps of the reaction. Thus, it would be preferable to perform most reactions in gaseous/air environment.

In contrast, the use of a controller to replenish solvent in one or more reaction droplets as described herein may be used without oil to prevent evaporation of the solvent, especially during operations that require high temperature and/or long incubation times (e.g., ≥65° C. for ≥1 min for aqueous droplets). To counteract evaporation the air-matrix DMF apparatus and methods described herein allow for temperature-controlled biochemical reactions where pre-treated replenishing droplets (e.g. of solvent) having controlled volumes and temperature are added periodically as triggered by a controller to replenished the reaction droplet. Typically, as the volume of a reaction droplet begins to decrease due to evaporation beyond a threshold, a replenishing droplet is dispensed into the air gap of the DMF apparatus having a controlled volume, and treated (e.g., by matching the temperature of the reaction droplet, combining with one or more reagents, etc.) and transported to combined/merge with the reaction droplet. This is illustrated in FIGS. 1D-1H.

Figures 1D, 1E, 1F, 1G, 1H:
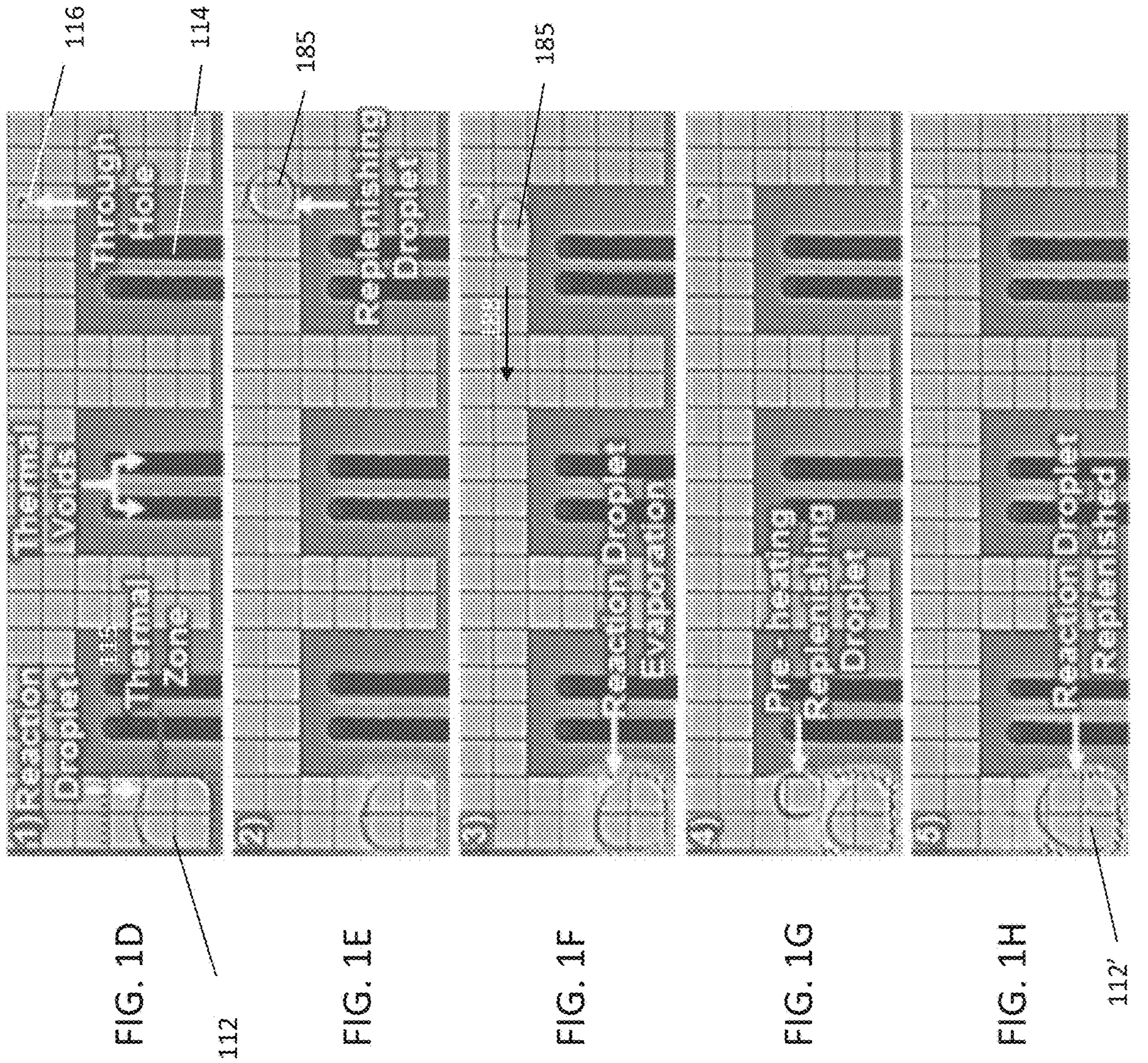
FIGS. 1D-1H shows a time series (FIG. 1D through FIG. 1H, respectively) of images of the air gap region of the air-matrix DMF apparatus of FIG. 1A-1C, illustrating the method of replenishing the reaction droplet using a replenishing droplet as described herein.

FIGS. 1D-1H shows a series of images depicting one example of a replenishing method to account for evaporation. In FIG. 1D, the reaction droplet 112 is held within a first thermal zone 115 on the far left. An aperture (through hole 116) is seen on the right. A controller may monitor the volume of the reaction droplet 112. In some variations the apparatus may "preload" a replenishing droplet from a reservoir of solvent through the aperture; alternatively the replenishing droplet may be dispensed as needed, when triggered by the reduction in volume detected by the controller. A replenishing droplets may be introduced through the aperture 116. As mentioned, the aperture may extend through the first plate or the second plate into the air gap. Once introduced into the air gap 104

The controller may monitor the volume (e.g., size) of the droplet in the air gap by any appropriate manner, including optically, e.g., imaging the droplet, detecting the size of the droplet by determining the boundary, e.g., surface, of the droplet, and calculate the overall size, and/or the size or extent of the droplet relative to the number and position of the cell units. For example, the apparatus may include a camera and/or lenses configured to image the droplet(s) in the air gap (e.g., through one or both plates), measure the size (e.g., area) of the droplet, and compare the measured size to a threshold that may be based on a baseline (which may be preset or may be derived from an earlier measurement). Thus a controller may include image-processing hardware, software and/or firmware (e.g., logic) to determine droplet size and/or compare droplets or droplet size to a baseline. When the size (as a proxy for volume) of the droplet has decreased by a threshold amount, the controller may prepare a replenishing droplet of solvent by moving a controlled volume of solvent into the same thermal zone or a thermal zone matching the temperature profile of the reaction droplet, allowing the replenishing droplet to reach the temperature of the reaction droplet, and then, once the temperature approximately match, combining the two. For example, the actuation electrodes may be activated to move a replenishing drop near the reaction droplet. Prior to merging the replenishing droplet with the reaction droplet, the temperature of the replenishing droplet may be adjusted to the temperature of the reaction droplet.

As shown in FIG. 1E, the replenishing droplet may be released from the aperture 116 ("through hole"). FIGS. 1C and 7 show an example where the aperture passes through the second plate (bottom plate) up to the air gap 104. In FIG. 1C, the bottom plate is fitted with a capillary tube and fittings to secure the capillary tube to the through hole 116. FIG. 7 shows the bottom surface of an example of an air-matrix DMF apparatus, showing how the fittings 703 and tubing 705 may be attached. In this example, tubing 705 may be connected to the aperture and thus fluidly connect to the air gap through fittings 703 and also connected to a solvent reservoir (not visible in FIG. 7). One or more solvent reservoirs may be connected to the through-hole channel/aperture via appropriate tubing. In some variations a valve (controlled by the controller) may also be used.

As shown in FIGS. 1F and 1G, the controller of the air-matrix DMF apparatus may move (arrow 188) a replenishing droplet 185 of solvent from the dispensing source (aperture 116) to the same thermal zone as the reaction droplet, as shown in FIG. 1G. Once there, the controller may allow the droplet to stay there until it has approximately equilibrated to the temperature of the reaction droplet (e.g., 1 second, 2 seconds, 5 seconds, 7 seconds, 8 seconds, 9 seconds, 10 seconds, 12 seconds, 15 seconds, 20 seconds, 30 seconds, 45 seconds, 1 minute, etc.). Thereafter, as shown in FIG. 1H, the controller may combine the droplet of solvent with the reaction droplet containing the solvent and solute forming the reaction mixture). The replenished reaction droplet 112' is shown in FIG. 1H. This process may be repeated as often as necessary.

Temperature matching the replenishing droplet(s) to the reaction droplet temperature as described herein is surprisingly effective, and the inventors have found that it minimizes the impact on reactions underway in the reaction droplet upon merging, surprisingly promoting consistency in reaction kinetics. Typically the temperature change in the reaction droplet when combining with a replenishing droplet as described herein results in a ≤1° C. change in reaction droplet temperature. Table 1 illustrates the temperature drop for four different temperatures and the change in temperature of the resulting reaction droplet after replenishment.

TABLE 1

| Target Temperature (° C.) | Temperature (° C.) Decrease of Reaction Droplet After Replenishment (Average ±) |
|---|---|
| 35 | 0.7 ± 0.15 |
| 55 | 0.5 ± 0.11 |
| 75 | 0.4 ± 0.08 |
| 95 | 0.2 ± 0.19 |

Figure 2:
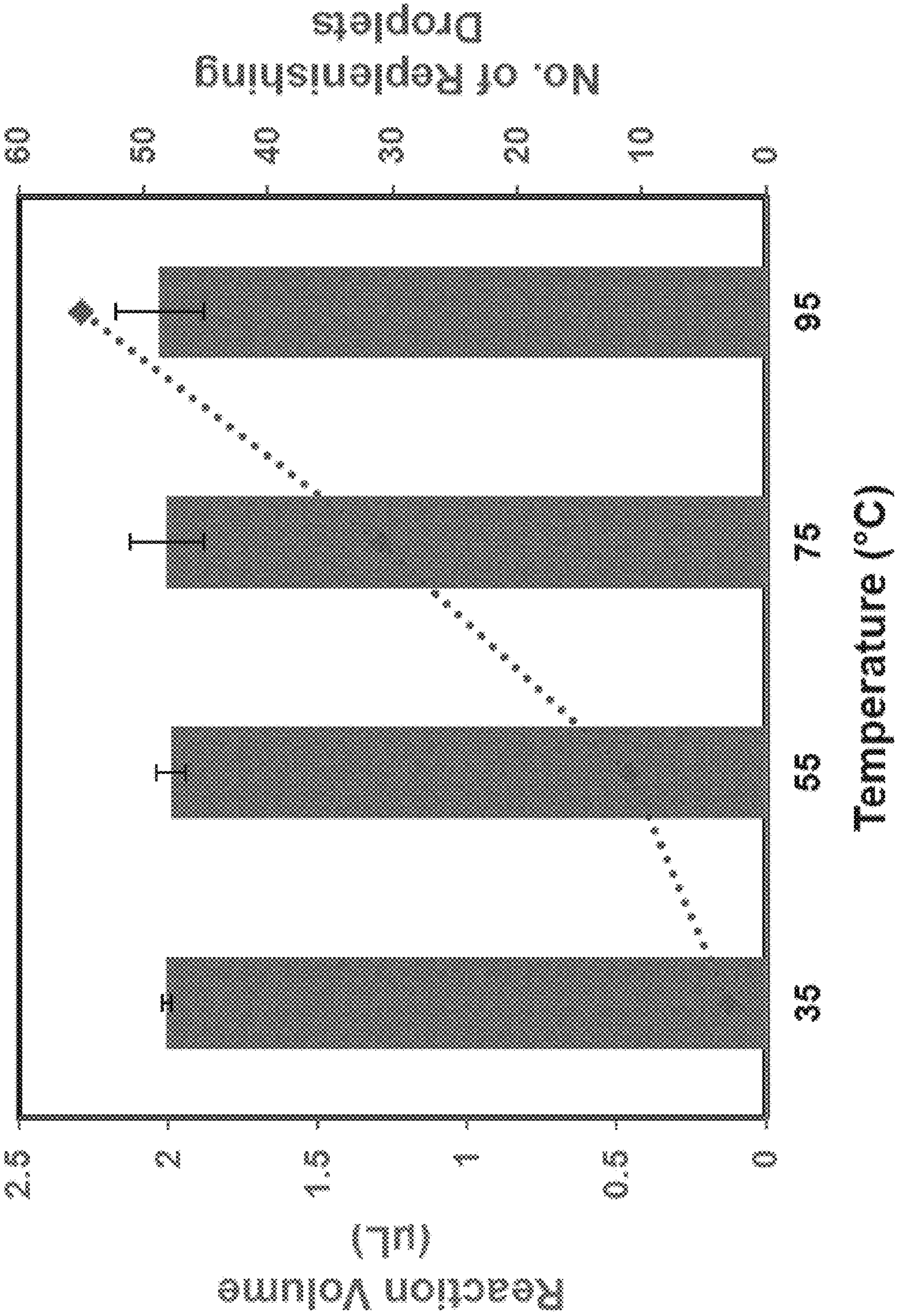
FIG. 2 is a graph showing the number of replenishing droplets (each approximately 0.5 μL each) required to sustain the (2 μL) reaction volume at different temperatures for 30 minutes.

In some examples, reaction droplets were replenished with solvent upon loss of 15-20% of their initial (target) volume, in order to minimize changes to solute concentration that could adversely affect reaction kinetics. Using this approach, reaction droplets of 2 μL were maintained at roughly constant volume (≤20% variation) over a wide range of temperatures (e.g., 35-95° C.). A graph showing both the variability in the reaction volume (bars, scale on left) and the number of replenishing droplets used to maintain this volume over the same time period (dotted line, scale on right) is shown in FIG. 2. For higher temperatures, e.g., 75° C. and 95° C., a greater number of droplets were needed to maintain the reaction mixture at a constant volume of 2 μL (approximately 30 and 55 droplets respectively). At lower volumes (nL to pL) this may be accomplished by decreasing the gap spacing between the DMF plates and/or the size of actuation electrodes; smaller droplets are more vulnerable to evaporation, however, so replenishing may occur at greater frequency to maintain a target volume. In this example, the droplet were 0.5 μL each and the experiment was conducted for 30 minutes. In other examples, the replenishing droplets were between 0.2 and 10 μL in volume (e.g., 0.2, 0.5, 1, 2, 3, 4, 5, 6, 7, 8, 9, 10 μL, etc.)

As mentioned, an air-matrix DMF device may detect evaporation by monitoring visually and the reaction volume may be replenished "just-in-time" by the controller (or manually). Alternatively or additionally, the apparatus may be configured to replenish reaction droplets in an open-loop fashion, by automatically replenishing droplets at a frequency that is dependent on the temperature at which the reaction droplet is being maintained. In this variation the controller may monitor just the time that the reaction droplet is held at a particular temperature and may supply replenishing droplets at an interval based on that incubation temperature(s). Thus, estimates may be made as to when a reaction droplet may need to be replenished and a replenishing droplet may be held in waiting nearby and heated for a short period of time prior to incorporating with the reaction droplet. In general, a replenishing droplet may be introduced based on detecting or monitoring the reaction droplet over the course of the reaction steps.

As mentioned above, replenishment time may also be controlled on a closed-loop (or semi-closed loop, allowing user intervention or per-determined exceptions) basis. For example, an air-matrix DMF device may generally include a sensing and feedback control system (controller) in which the reaction droplet's volume (e.g., size) and/or concentration is monitored and, upon reaching a pre-determined threshold, the volume automatically reconstituted through addition of a replenishing droplet.

As mentioned above, alternatively or additionally to the visual/optical methods described above, detection, e.g. of evaporation, may be accomplished by detection of an electrical property at the electrode occupied by (e.g., adjacent and above or below) the reaction droplet. For example, either the actuation electrodes or a separate sensing electrode associated with each unit cell or a group of unit cells may be configured to use the location of the reaction droplet relative to the unit cell(s) to monitor any change in the reaction droplet size. For example, a reaction droplet of approximately 4 μL may overlap with two unit cells; the electrodes corresponding to these unit cells may sense the presence of a droplet by a change in the droplet base area which results in the change of an electrical property (e.g., capacitance, resistance, etc.) between the actuation and/or sensing electrode and ground (or between adjacent actuation and/or sensing electrodes); the volume of the droplet within the unit cell (or the entire droplet) and may affect the electrical property. This is particularly true when an entire unit cell no longer contains fluid of the reaction droplet. When one of the unit cell (e.g., by interrogating the actuation electrode associated with the unit cell) no longer contains enough of the reaction droplet (and where no movement of the droplet out of the cell has occurred), the controller may prepare a replenishing droplet within a given period of time. The air-matrix DMF apparatus may be configured or calibrated for different droplet volumes to detect and/or different thresholds of volume reduction/evaporation to trigger replenishing, e.g., when the droplet has decreased by a certain percentage (e.g. 20%, 25%, 30%, 35%, 40%, 45%, 50%, 55%, etc.). In some other variations, the controller may be able to sense changes in capacitance, impedance, resistance, etc., of the reaction droplet and initiate a replenishing protocol based upon detected changes in impedance or capacitance.

Figure 9:
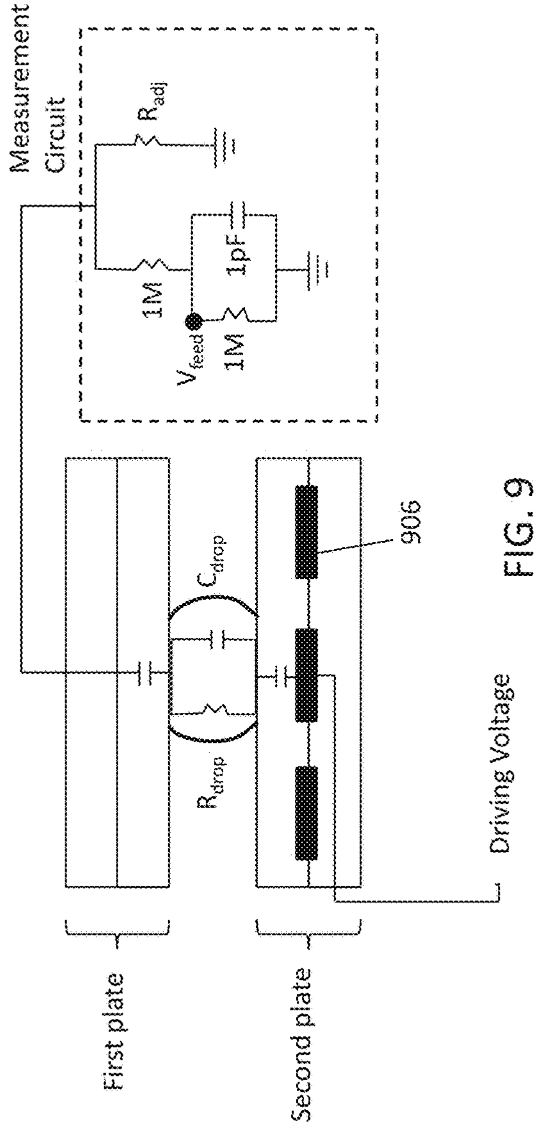
FIG. 9 shows an example of a detection circuit for detecting an electrical property of a droplet in one or more unit cells of an air-matrix DMF (e.g., a change in an electrical property as the droplet evaporates).

Thus, in any of the air-matrix DMF apparatuses described herein, the controller may be configured to use the actuation electrodes to sense the size of the droplet (reaction droplet). In standard operation of the DMF apparatus, a droplet may be moved by application of voltage to an electrode neighboring the droplet. Success of the droplet actuation/movement may be detected using feedback based on the electrical property. For example, a DMF apparatus may report a change in an electrical parameter value resulting from a change when a droplet is between (or leaves) the actuation electrode and the ground as the droplet moves. As FIG. 9 (adapted from Shih et al., Lab Chip, 2011, 11, 535-540) shows, the droplet may be modeled as part of an electrical circuit (an RC circuit) and its electrical properties (e.g., RC properties) may be sensed or detected as a function of the measured potential, $V_{feed}$ (at the node, as may be measured across the 1M resistor shown in FIG. 9). When a droplet is not present on an electrode (e.g., actuating electrode 906), the value of $V_{feed}$ equals zero, due to very high impedance of air; as a droplet moves over electrode, the finite impedance of the liquid gradually increases $V_{feed}$ to a positive threshold value, reflecting full electrode coverage and successful droplet actuation. Change of $V_{feed}$ in this scenario or of any other feedback parameter depending on droplet area size can be used to deduct two types of information: first, whether the droplet actuation was successful, and the droplet fully occupies the electrode (and this the actuation potential can be reapplied/adjusted to correct the droplet motion), and second, how much of an area is occupied by a droplet.

Figure 10:
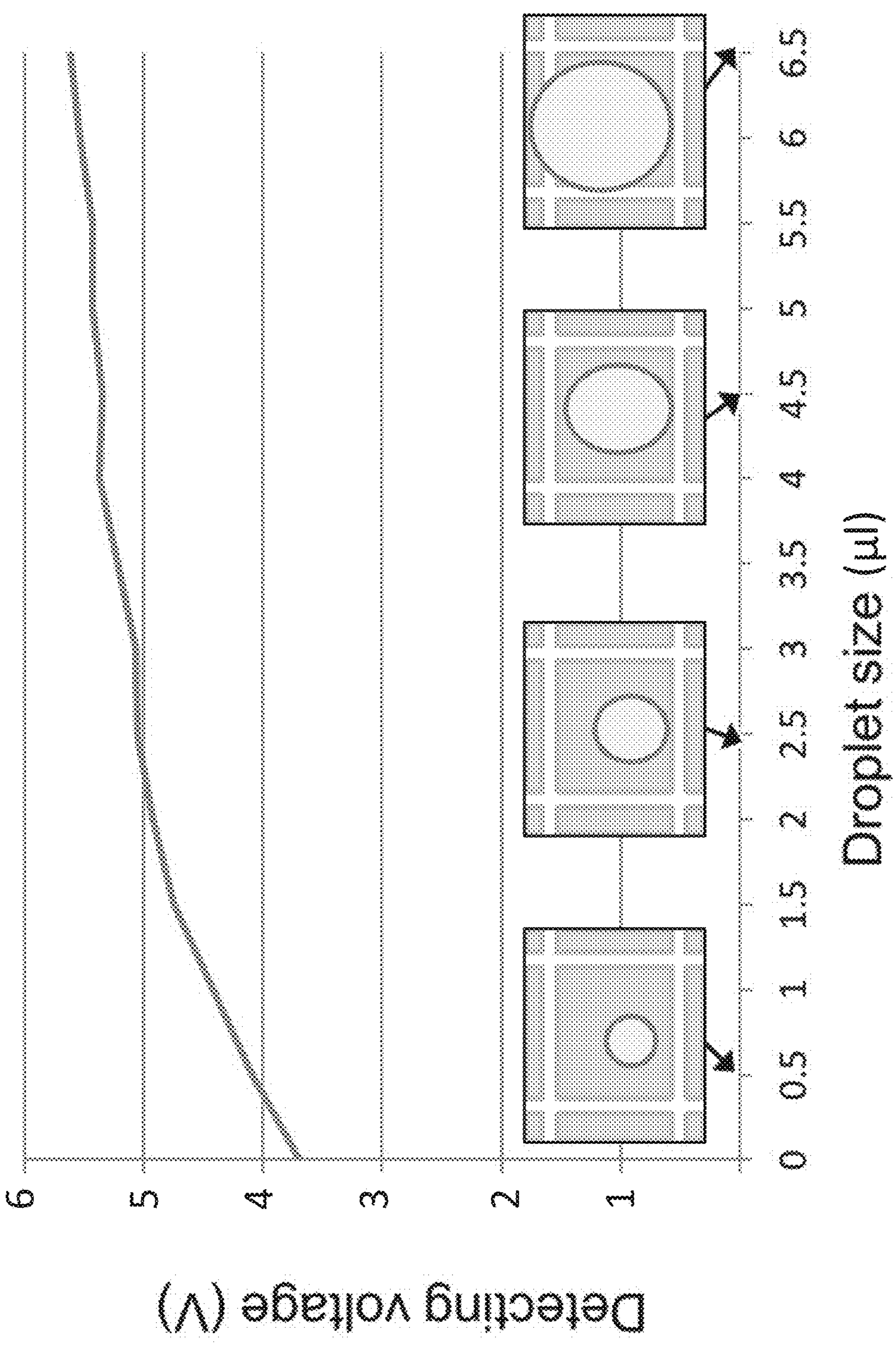
FIG. 10 illustrates the change in electrical properties detected by a sensing circuit as a droplet evaporates, which may be used by an air-matrix DMF apparatus to control replenishment of reaction droplets as described herein.

FIG. 10 illustrates the correlation between the electrical property (feedback) parameter and the droplet size. As shown, the larger the droplet, and therefore the more electrode area that is covered by the droplet, the higher the voltage reading (e.g., $V_{feed}$, the detecting voltage from a circuit such as the one shown in FIG. 9) will be. The information about the area covered by the droplet can thus be used for determining evaporation rate of a stationary droplet. For example, the evaporation rate can be used to trigger evaporation management methods like droplet replenishment as described herein. In one example, the baseline volume assumes for the reaction droplet occupies 100% of the electrode 'coverage' in a unit cell; if the feedback voltage readout indicates that 70% of the electrode area is covered by a droplet, then the controller may determine that 30% of the droplet has evaporated, and trigger release, pretreatment and merger of a replenishing droplet with the reaction droplet to correct for the loss of volume.

In other variations, the change in the droplet size may be monitored through visual/optical means. As mentioned, the air-matrix DMF apparatus may be coupled to an optical detector to monitor the droplet size over the course of the reaction. The optical detector may be in communication with the controller such that when a drop in volume of the reaction droplet below a certain threshold amount occurs, the controller will initiate pre-treatment (e.g., temperature matching) of an appropriately sized (e.g., a fixed size or a size matching the amount of evaporation) replenishing droplet to be delivered. For example, in one variation the reaction droplet may be colored with a dye or other colored tag such that when a detector measures a colorimetric change in the reaction droplet (increase in intensity of the reaction droplet), it will initiate a replenishing drop protocol to heat or cool the reagent droplet and send it to the reaction droplet. In some instances, it may be possible to use a fluorescence tag that provide a change in fluorescence intensity when the reaction droplet has decreased by a predetermined volume.

In some examples, an air-matrix DMF apparatus may include circuitry that communicates to an outside smart device or computer source (e.g. desktop, laptop, mobile device, etc.) where the smart device or computer may control, monitor, and/or record the droplets being sent to replenish the reaction mixture. A program dedicated to overseeing the replenishment process may be advantageous in instances where the reaction requires different temperatures or different reagents at its various steps.

Figure 3A:
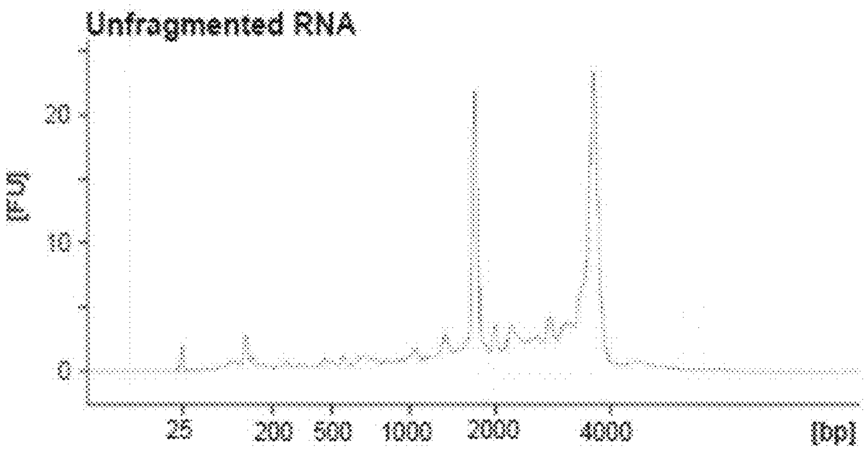
FIGS. 3A-3C illustrates the use of high-temperature air-matrix DMF to detect RNA fragmentation compared to conventional methods.
Figure 3B:
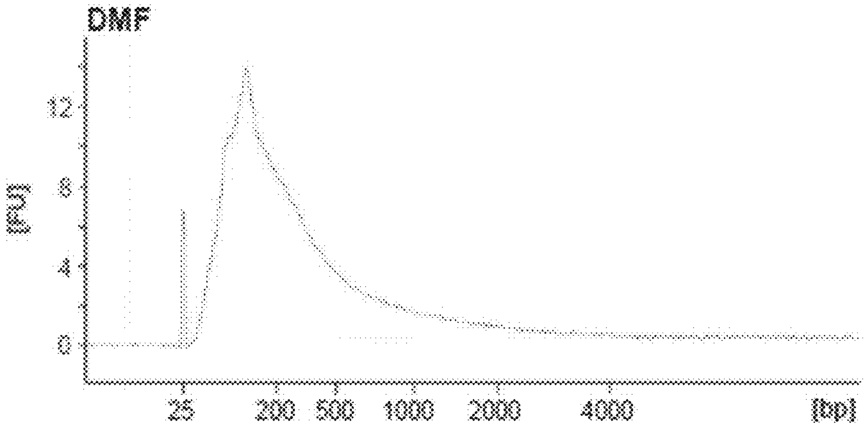
Figure 3C:
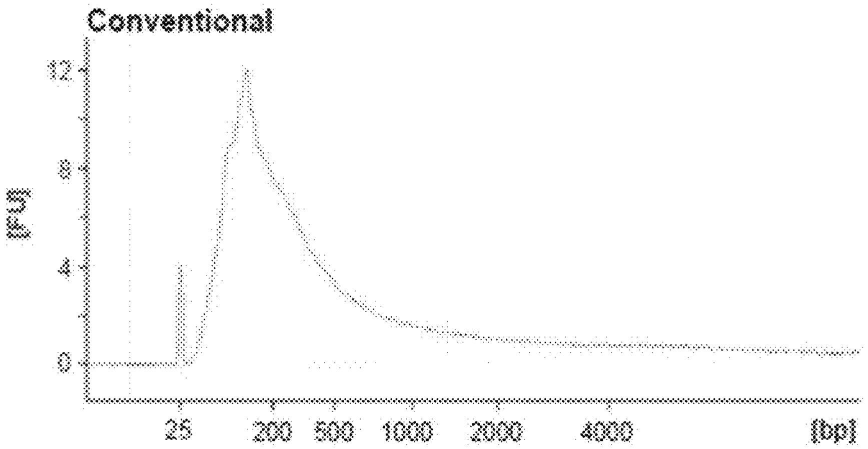

Analyses of the replenishing techniques described herein have been performed, showing comparable or superior results compared to corresponding traditional techniques. For example, FIGS. 3A-3C shows a series of traces from an RNA fragmentation experiment. Surprisingly, superior yield was achieved using the replenishing apparatus and methods described herein, as shown by comparing FIGS. 3B and 3C. A detailed description of the experimental conditions is included below in Example 3. In FIG. 3A, the spectrum shows the un-fragmented starting RNA. The spectrum of FIG. 3B show the results of the fragmentation reaction using an air-matrix DMF apparatus using replenishing droplets as described herein as described here, and the spectrum shown in FIG. 3C shows the results of the fragmentation using conventional methods. As can be seen, the spectrum obtained from the air-matrix DMF apparatus had a nearly identical or superior yield compared to that obtained from a conventional method. Even the fine features of the spectrum (e.g., the slim shoulder on the left and the broader shoulder on the right) are present in both spectra.

Figure 4A:
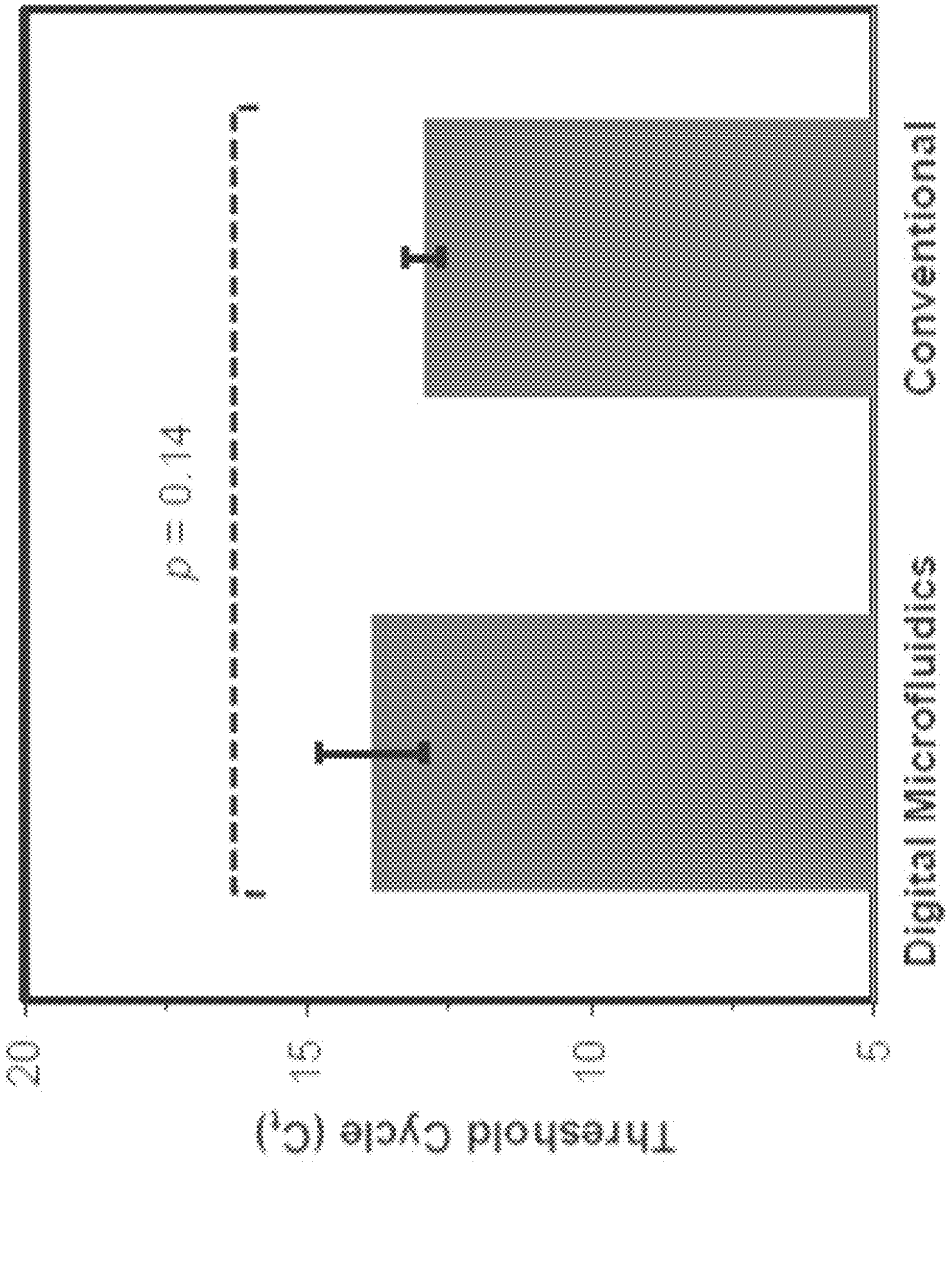
FIG. 4A is a graphical comparison of first-strand cDNA synthesis performed with air-matrix DMF using controlled rehydration as described herein (on left) or with conventional methods (on right). First-strand cDNA yields were measured using qPCR. Each bar indicates the mean±standard deviation of the threshold cycle (CO measurements for products from three independent first-strand cDNA synthesis reactions. P values were calculated using Student's t-test (unpaired, two-tailed, unequal variances).
Figure 4B:
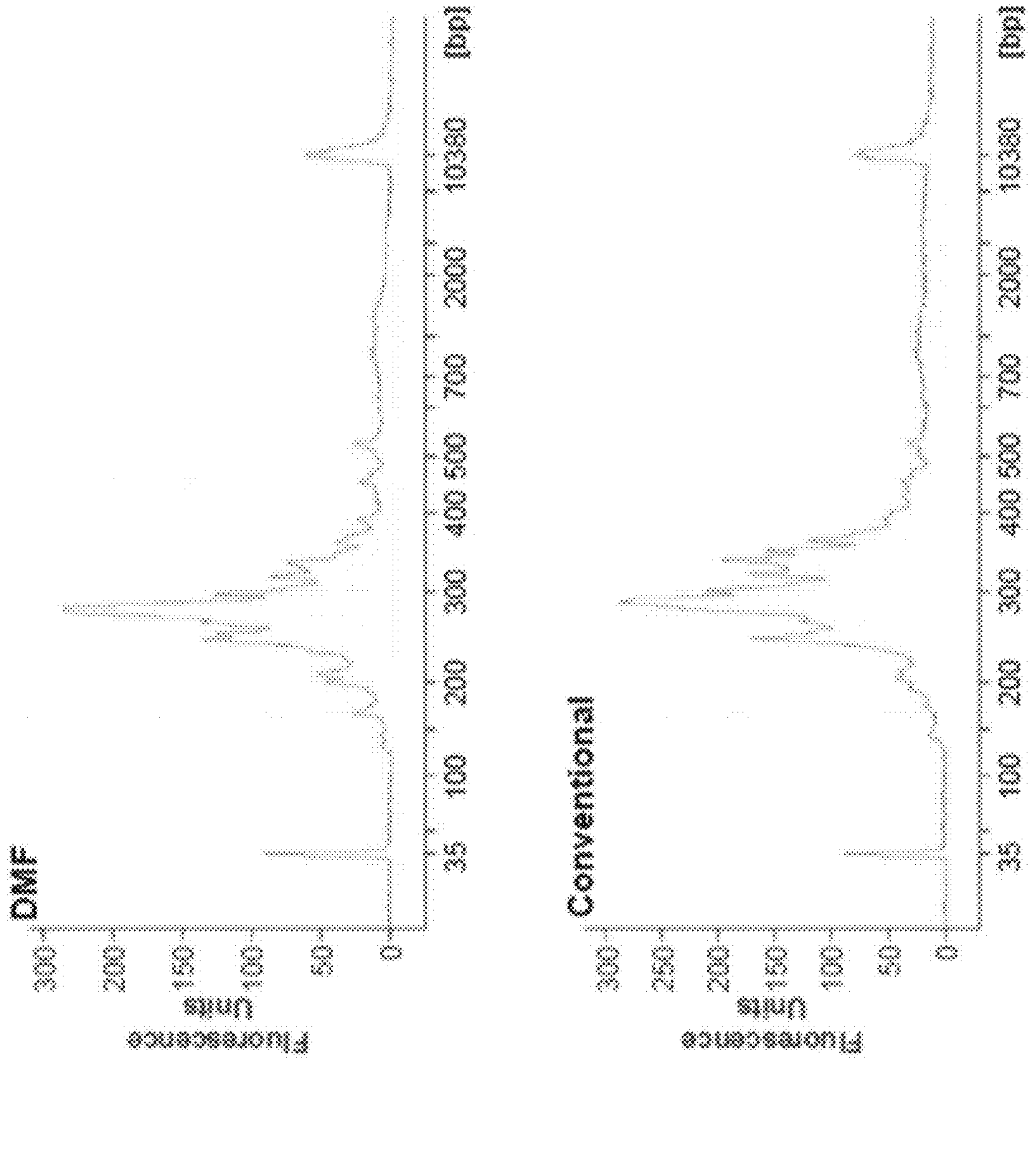
FIG. 4B shows a comparison of yield and size distribution profiles of double-stranded cDNA libraries generated using the air-matrix DMF with controlled rehydration described herein (top) and conventional techniques (bottom). Fragment size measurements were made using a High Sensitivity DNA Assay Chip on a 2100 Bioanalyzer (Agilent, Santa Clara Calif.).

Similarly, FIGS. 4A and 4B shows a comparison of DNA synthesis using the DMF device and methods using replenishing droplets as described herein compared to conventional qPCR techniques. FIG. 4A shows the threshold cycle time of the air-matrix DMF apparatus and FIG. 4B shows the results with conventional techniques. As shown, the threshold cycle (CO for the air-matrix DMF apparatus is nearly identical to that using conventional methods. FIG. 4B shows the spectra from the air-matrix DMF apparatus (top) and from conventional methods (bottom). As can be seen from the two spectra, the results from the air-matrix DMF apparatus using replenishing droplets as described herein produced product that fluoresced between 200 and 400 bp, similar or identical to the resulting product obtained from traditional methods. Also, the amplitudes of the two signals are also of similar intensity. Surprisingly, the resulting products from the air-matrix DMF apparatus gave a cleaner spectrum than that from the conventional technique, which appears to be noisier between 300 bp and 400 bp.

Figure 5:
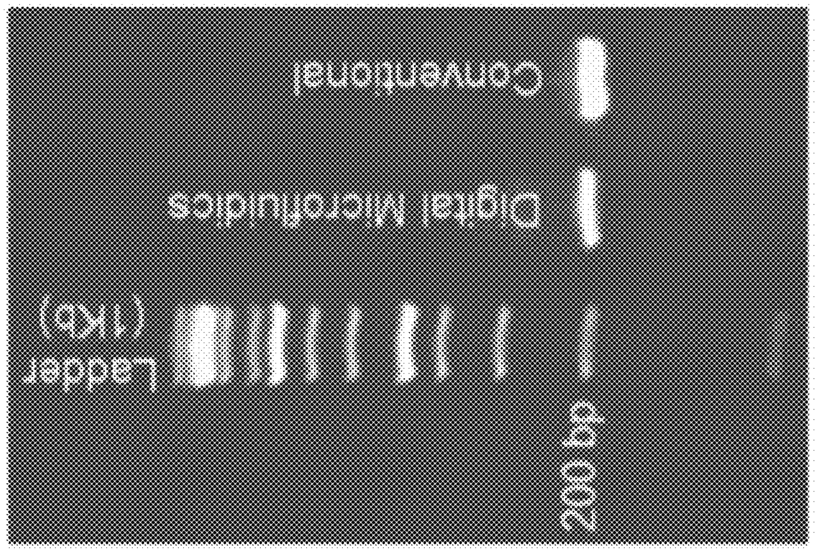
FIG. 5 shows a comparison of polynucleotide (DNA) amplification using the air-matrix DMF with controlled rehydration described herein and conventional techniques. As shown in the gel electrophoresis results, a sample generated by PCR using the air-matrix DMF with controlled rehydration described herein has the correct size and approximately the same amount. Bacteriophage M13mp18 genomic DNA served as the template, and primers were designed to yield a PCR product of 200 bp.

FIG. 5 shows a comparison of traditional PCR experimental results from using the air-matrix DMF apparatus with replenishing as described herein and from conventional means using gel electrophoresis. As the gel shows, both the air-matrix DMF apparatus-derived results and the conventional methods produced product the target 200 bp fragment when compared to the ladder standard (experimental details may be found in Example 4).

Example 1: RNA Extraction

For extraction of total RNA from human PBMC, 5-10× $10^6$ cells were centrifuged at 1,000 rpm at 4° C. for 5 min, and re-suspended in 1 ml of RNAzol (Molecular Research Center; Cincinnati, Ohio), followed by dilution with 400 μl of water. After incubation at room temperature (RT) for 15 min, the samples were centrifuged at 16,000 rpm at 4° C. for 15 min, and −800 μl of the aqueous phase from each tube were transferred to a new 2-ml tube and mixed 1:1 with ethanol. Purified total RNA was recovered using the Direct-zol kit (Zymo Research; Irvine, Calif.), following the manufacturer's instructions and eluting in 10 μL of water. RNA yield was quantified using a Qubit 2.0 fluorimeter (Life Technologies; Carlsbad, Calif.), and fragment size distribution was assessed using a 2100_Bioanalyzer equipped with an RNA Nano 6000 Chip (Agilent; Santa Clara, Calif.). RNA samples were stored at −80° C.

Example 2: RNA Fragmentation

DMF-mediated RNA fragmentation was implemented in three steps. First, three droplets (0.5 μL each) containing 180 ng/μL of human PBMC total RNA (270 ng RNA final) and a droplet (0.5 μL) of diluted 10× NEBNext fragmentation buffer (New England Biolabs; Ipswitch, Mass.) (4× final) were dispensed from their respective reservoirs, mixed on the DMF surface for 10 sec, and transported to a thermal zone. Second, the reaction droplet (2 μL; 270 ng RNA and 1× fragmentation buffer final) was incubated at 94° C. for 3 min Finally, the reaction was cooled to 4° C., and RNA fragmentation was terminated by supplementing the reaction with a droplet (0.5 μL) of NEBNext stop solution (New England Biolabs; Ipswitch, Mass.). The reaction volume was maintained through addition of six replenishing droplets of nuclease-free distilled water (0.5 μL each) over the course of the experiment. For RNA fragmentation using the conventional benchscale method, processing was identical except for the volumes [18 μL of 15 ng/μL RNA (270 ng RNA final), 2 μL of 10× fragmentation buffer (1× final), and 2 μL of stop solution] and that incubations were carried out in microcentrifuge tubes heated by a conventional thermocycler. In both cases, RNA fragmentation reaction products were purified using the Zymo RNA Clean and Concentrator-5 system (Zymo Research; Irvine, Calif.), following the manufacturer's general procedure and eluting in 5 μl of nuclease-free distilled water. RNA fragment size distributions were analyzed using an RNA Nano 6000 Chip on a 2100 Bioanalyzer (Agilent; Santa Clara, Calif.).

Example 3: cDNA Synthesis

First-strand cDNA synthesis was accomplished through DMF or benchscale implementation of the Peregrine method. For DMF-mediated cDNA synthesis, a five-step protocol was developed. First, a 0.5 μL droplet of fragmented human PBMC total RNA (100 ng) and a 0.5 μL droplet of primer PP_RT (25 mM) were dispensed from their respective reservoirs, merged and mixed on the DMF surface, and the 1 μL droplet transported to a thermal zone. Second, the droplet was incubated at 65° C. for 2 mM, and then immediately cooled to 4° C. Third, three droplets of master mix [0.5 μL each, containing 45% of SMARTScribe 5× First-Strand Buffer (Clontech; Mountain View, Calif.), 5.5% of 20 mM DTT, 22% of 10 mM dNTP mix, 5.5% of RiboGuard RNase inhibitor (Epicentre; Madison, Wis.) and 22% of SMARTScribe Reverse Transcriptase (Clontech; Mountain View, Calif.), as well as Pluronic F127 at 0.1% w/v) were dispensed onto the DMF surface, merged with the 1 μL droplet, and the reaction incubated at RT for 3 min followed by 42° C. for 1 min Fourth, a 0.5 μL droplet of primer PP_TS (12 mM) was merged with the reaction droplet, and incubation continued at 42° C. for 1 h Finally, the reaction was terminated by incubating at 70° C. for 5 min. In all cases, temperature changes were carried out by shuttling the reaction droplet between thermal zones 115 set at the desired temperatures, as described above. The reaction volume was maintained through addition of 13 replenishing droplets of nuclease-free distilled water (0.5 μL each) over the course of the experiment. For first-strand cDNA synthesis using the conventional benchscale method, processing was identical except for the volumes (3.5 μL of fragmented RNA, 1 μL of primer PP_RT, 4.5 μL of master mix, and 1 μL of primer PP_TS) and that incubations were carried out in microcentrifuge tubes heated by a conventional thermocycler. In both cases, first-strand cDNA synthesis reaction products were purified using AMPure XP beads (Beckman Coulter Genomics; Danvers, Mass.), using 1.8× volumes and eluting in 10-20 μl of nuclease-free distilled water, following the manufacturer's protocol. A qPCR-based assay was used to determine the number of PCR cycles needed for optimal production of high-quality double-stranded cDNA libraries from first-strand cDNA synthesis reaction products. After diluting the first-strand cDNA 1:10 in nuclease free water, 1 μl of the dilution was combined with 5 μl of SsoFast EvaGreen SuperMix (Bio-Rad; Hercules, Calif.), 3 μl of nuclease-free water, 0.5 μl of 10 mM primer PP_P1 (5'-CAGGACGCTGTTCCGTTCTATGGG-3'), and 0.5 μl of 10 mM primer PP_P2 (5'-CAGACGTGTGCTCTTCCGATC T-3'). The assays were run in quadruplicate on a CFX96 qPCR machine (Bio-Rad; Hercules, Calif.), using the following cycle parameters: 95° C. for 45 sec, followed by 25 cycles of 95° C. for 5 sec and 60° C. for 30 sec. The cycle number at which fluorescence intensity exceeded the detection threshold [i.e., the cycle threshold ($C_t$)] was identified as optimal for production of double-stranded cDNA libraries from the undiluted first-strand cDNA synthesis reaction products. The yields and size distribution profiles of cDNA libraries were analyzed using a High Sensitivity DNA Assay Chip on a 2100 Bioanalyzer (Agilent; Santa Clara, Calif.).

Example 4: PCR

Single-stranded genomic DNA from bacteriophage M13mp18 was diluted in nuclease-free water to a concentration of 250 pg/μL. The forward and reverse primers (each 500 μM in 10 mM Tris-HCl), designed for amplification of a 200-bp region (positions 4905-5104) of the M13mp18 genome, were mixed in equimolar ratio and diluted in nuclease-free water to generate a 4× stock solution (4 μM per primer). PCR reactions were assembled using Hot Start Taq 2× Master Mix (New England Biolabs; Ipswitch, Mass.) supplemented with 0.025 units/μL of Hot Start Taq polymerase (New England Biolabs; Ipswitch, Mass.), effectively doubling the Taq concentration in the 2× Master Mix. For PCR on the DMF device, droplets of master mix, primers, and template (0.5 μL each) were dispensed from their respective reservoirs, merged and mixed on the DMF surface, and transported to thermal zones 115 for temperature cycling (Table 51): 95° C. for 45 sec; then 33 cycles of 95° C. for 20 sec, 50° C. for 30 sec, and 68° C. for 45 sec; and finally 68° C. for 5 min Replenishing droplets (0.5 μL each) were added to the reaction droplet at the end of each 95° C. step. For conventional PCR, the reaction mixture composition was identical but scaled up to 20 μL total, and temperature cycling was identical but accomplished using a conventional bench-top thermocycler (CFX96; Bio-Rad; Hercules, Calif.). PCR products were analyzed by gel electrophoresis, using 2% agarose gels in the E-Gel electrophoresis system (Life Technologies; Carlsbad, Calif.).

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An air-matrix digital microfluidic (DMF) apparatus configured to replenish solvent in a reaction droplet to correct for evaporation, the apparatus comprising:

a first plate having a first hydrophobic layer;

a second plate having a second hydrophobic layer;

an air gap formed between the first and second hydrophobic layers;

a plurality of actuation electrodes adjacent to the first hydrophobic layer, wherein each actuation electrode defines a unit cell within the air gap;

one or more ground electrodes;

a thermal regulator, wherein the thermal regulator forms a thermal zone in the air gap comprising a plurality of adjacent unit cells, further wherein the thermal regulator is configured to heat and/or cool the reaction droplet when it is within the thermal zone;

a sensor configured to detect a change in a volume of a reaction droplet within the air gap; and a controller in communication with the sensor and configured to detect the change in the volume of the reaction droplet below a threshold value and to combine a replenishing droplet with the reaction droplet.

2. The apparatus of claim 1, wherein the sensor configured to detect the change in the volume of the reaction droplet comprises an optical sensor.

3. The apparatus of claim 1, wherein the sensor configured to detect the change in the volume of the reaction droplet comprises an electrical sensor configured to detect an electrical property between one or more actuation electrodes and the one or more ground electrodes.

4. The apparatus of claim 1, wherein the controller is configured to detect a change in the volume of the reaction droplet based on input from the sensor.

5. The apparatus of claim 1, wherein the controller is configured to combine the replenishing droplet with the reaction droplet by applying energy to actuation electrodes of the DMF apparatus to move the replenishing droplet, the reaction droplet or the replenishing droplet and the reaction droplet within the air gap.

6. The apparatus of claim 1, wherein the controller is configured to adjust a temperature of the replenishing droplet to match a temperature of the reaction droplet.

7. The apparatus of claim 1, further comprising an aperture through one of the first plate and the second plate forming the air gap, wherein the aperture is configured to connect to a source of solvent and to form a replenishing droplet.

8. An air-matrix digital microfluidic (DMF) apparatus configured to replenish solvent in a reaction droplet to correct for evaporation, the apparatus comprising:

a first plate having a first hydrophobic layer;

a second plate having a second hydrophobic layer;

an air gap formed between the first and second hydrophobic layers;

a plurality of actuation electrodes adjacent to the first hydrophobic layer, wherein each actuation electrode defines a unit cell within the air gap;

one or more ground electrodes;

a thermal regulator, wherein the thermal regulator forms a thermal zone comprising a plurality of adjacent unit cells, further wherein the thermal regulator is configured to heat and/or cool the reaction droplet within the thermal zone;

an optical sensor configured to detect a change in the volume of a reaction droplet within the air gap; and a controller in communication with the optical sensor and configured to detect the change in the volume of the reaction droplet below a threshold value and to: introduce a replenishing droplet into the air gap, adjust a temperature of the replenishing droplet to match a temperature of the reaction droplet; and combine the replenishing droplet with the reaction droplet when the replenishing droplet temperature matches the reaction droplet temperature.

9. The apparatus of claim 8, further comprising a temperature detector in thermal communication with the thermal zone.

10. The apparatus of claim 8, further comprising at least one thermal void adjacent to the thermal zone and configured to prevent or reduce a transfer of thermal energy between the thermal zone and unit cells outside of the thermal zone.

11. The apparatus of claim 8, wherein the thermal regulator comprises a thermoelectric heater.

12. The apparatus of claim 8, wherein the controller is configured to detect a change in the volume of the reaction droplet based on input from the optical sensor.

13. The apparatus of claim 8, wherein the controller is configured to combine the replenishing droplet with the reaction droplet by applying energy to actuation electrodes of the DMF apparatus to move the replenishing droplet, the reaction droplet or the replenishing droplet and the reaction droplet within the air gap.

14. An air-matrix digital microfluidic (DMF) apparatus configured to replenish solvent in a reaction droplet to correct for evaporation, the apparatus comprising:

- a first plate having a first hydrophobic layer;
- a second plate parallel to the first plate and having a second hydrophobic layer;
- an air gap formed between the first and second hydrophobic layers;
- a plurality of actuation electrodes adjacent to the first hydrophobic layer, wherein each actuation electrode defines a unit cell within the air gap;
- one or more ground electrodes adjacent to one or more actuation electrodes of the plurality of actuation electrodes;
- a thermal regulator, wherein the thermal regulator forms a thermal zone comprising a plurality of adjacent unit cells, further wherein the thermal regulator is configured to heat and/or cool the reaction droplet within the thermal zone;
- a sensor configured to detect a change in the volume of a reaction droplet within the thermal zone;
- an aperture through one of the first plate and the second plate forming the air gap, wherein the aperture is configured to connect to a source of solvent; and
- a controller in communication with the sensor and configured to detect the change in the volume of the reaction droplet below a threshold value and to: introduce a replenishing droplet into the air gap out of the aperture, adjust a temperature of the replenishing droplet to match a temperature of the reaction droplet; and combine the replenishing droplet with the reaction droplet when the replenishing droplet temperature matches the reaction droplet temperature.

15. The apparatus of claim 14, further comprising a temperature detector in thermal communication with the thermal zone.

16. The apparatus of claim 14, further comprising a series of reagent reservoirs configured to hold reaction components.

17. The apparatus of claim 14, further comprising at least one thermal void adjacent to the thermal zone and configured to prevent or reduce a transfer of thermal energy between the thermal zone and unit cells outside of the thermal zone.

18. The apparatus of claim 14, comprising a tubing adapter configured to couple to the aperture to form the replenishing droplet.

19. The apparatus of claim 14, wherein the thermal regulator comprises a thermoelectric heater.

20. The apparatus of claim 14, wherein the sensor configured to detect the change in the volume of the reaction droplet comprises an optical sensor.

21. The apparatus of claim 14, wherein the sensor configured to detect the change in the volume of the reaction droplet comprises an electrical sensor configured to detect an electrical property between one or more actuation electrodes and the one or more ground electrodes.

22. The apparatus of claim 14, wherein the controller is configured to detect a change in the volume of the reaction droplet based on input from the sensor.

23. The apparatus of claim 14, wherein the controller is configured to control a valve in fluid communication with a source of replenishing fluid.

24. The apparatus of claim 14, wherein the controller is configured to combine the replenishing droplet with the reaction droplet by applying energy to actuation electrodes of the DMF apparatus to move the replenishing droplet, the reaction droplet or the replenishing droplet and the reaction droplet within the air gap.

* * * * *